(12) United States Patent
Yang et al.

(10) Patent No.: US 12,499,575 B2
(45) Date of Patent: Dec. 16, 2025

(54) VEHICLE NAVIGATION IMAGE SYNTHESIS METHOD AND DEVICE, AND STORAGE MEDIUM

(71) Applicant: Faurecia Clarion Electronics (Xiamen) Co., Ltd., Fujian (CN)

(72) Inventors: Pengfei Yang, Fujian (CN); Qingyang Su, Fujian (CN); Tudui Hong, Fujian (CN)

(73) Assignee: Faurecia Clarion Electronics (Xiamen) Co., Ltd., Xiamen (CN)

( * ) Notice: Subject to any disclaimer, the term of this patent is extended or adjusted under 35 U.S.C. 154(b) by 265 days.

(21) Appl. No.: 18/116,941

(22) Filed: Mar. 3, 2023

(65) Prior Publication Data
US 2023/0290002 A1 Sep. 14, 2023

(30) Foreign Application Priority Data
Mar. 11, 2022 (CN) .......................... 202210242346.7

(51) Int. Cl.
*G06T 7/73* (2017.01)
*G01C 21/36* (2006.01)
*G06T 3/606* (2024.01)

(52) U.S. Cl.
CPC ............ *G06T 7/74* (2017.01); *G01C 21/3602* (2013.01); *G01C 21/3632* (2013.01); *G06T 3/606* (2013.01); *G06T 2207/20068* (2013.01); *G06T 2207/20212* (2013.01); *G06T 2207/30244* (2013.01); *G06T 2207/30252* (2013.01)

(58) Field of Classification Search
CPC . G06T 7/74; G06T 3/606; G06T 2207/20068; G06T 2207/20212; G06T 2207/30244; G06T 2207/30252; G06T 2207/10016; G06T 3/14; G06T 7/33;
(Continued)

(56) References Cited

U.S. PATENT DOCUMENTS

| 10,870,350 | B2 * | 12/2020 | Wakatsuki | ......... G02B 27/0179 |
| 2005/0285940 | A1 * | 12/2005 | Kamijo | ................... G08G 1/04 348/149 |

(Continued)

FOREIGN PATENT DOCUMENTS

| CN | 102062574 B | 8/2012 |
| CN | 102706319 B | 5/2015 |

(Continued)

*Primary Examiner* — Anne Marie Antonucci
*Assistant Examiner* — Luis G Del Valle
(74) *Attorney, Agent, or Firm* — Patterson + Sheridan, LLP

(57) ABSTRACT

A vehicle navigation image synthesis method includes: acquiring M sampling images; storing N sampling images, a value of N being determined according to a speed of a target vehicle, a position of the target vehicle, and a following distance of the target vehicle; determining a plurality of sampling points of each sampling image of the N sampling images; determining first coordinates of each sampling point of the plurality of sampling points of each sampling image; mapping the first coordinates of each to the reference coordinate system to determine a second coordinate of each sampling point; and synthesizing sampling points of the N sampling images according to second coordinates of the sampling points of the N sampling images to determine a target image.

20 Claims, 16 Drawing Sheets

(58) Field of Classification Search
CPC .............. G06T 3/4038; G06T 5/50; G06T 2207/30256; G01C 21/3602; G01C 21/3632
See application file for complete search history.

(56) References Cited

U.S. PATENT DOCUMENTS

| | | | | |
|---|---|---|---|---|
| 2015/0234045 | A1* | 8/2015 | Rosenblum | G01S 13/931 |
| | | | | 342/70 |
| 2022/0082403 | A1* | 3/2022 | Shapira | G06V 10/762 |
| 2022/0167121 | A1* | 5/2022 | Vassilyev | H04W 4/029 |
| 2023/0055919 | A1* | 2/2023 | Yoo | B60W 50/10 |

FOREIGN PATENT DOCUMENTS

| | | |
|---|---|---|
| CN | 103546680 B | 6/2018 |
| CN | 106156723 B | 2/2019 |
| CN | 106205170 B | 6/2020 |

\* cited by examiner

VEHICLE NAVIGATION IMAGE SYNTHESIS METHOD AND DEVICE, AND STORAGE MEDIUM

CROSS-REFERENCE TO RELATED APPLICATION

This application claims priority to Chinese Patent Application No. 202210242346.7, filed on Mar. 11, 2022, which is incorporated herein by reference in its entirety.

TECHNICAL FIELD

The present disclosure relates to the field of communication technologies, and in particular, to a vehicle navigation image synthesis method, a vehicle navigation image synthesis device, and a storage medium.

BACKGROUND

In order to improve the safety of vehicle driving or reduce the difficulty of driving the vehicle by the driver, during the driving process of the vehicle, an electronic device in the vehicle may provide driving assistance for the driver according to image information of a junction. At present, the driving assistance for the driver is mainly based on navigation map data or image information of the entire junction acquired by a vehicle-mounted camera.

SUMMARY

In a first aspect, some embodiments of the present disclosure provide a vehicle navigation image synthesis method. The method includes: acquiring M sampling images; storing N sampling images; determining a plurality of sampling points of each sampling image of the N sampling images; determining first coordinates of each sampling point of the plurality of sampling points of each sampling image; mapping the first coordinates of each sampling point to the reference coordinate system to determine second coordinates of each sampling point; and synthesizing sampling points of the N sampling images according to second coordinates of the sampling points of the N sampling images to determine a target image. The M sampling images include a preset sampling image for establishing a reference coordinate system, and M is a positive integer; N is a positive integer less than or equal to M, a value of N is determined according to a speed of a target vehicle, a position of the target vehicle, and a following distance of the target vehicle; the first coordinates include a first Y-coordinate and a first X-coordinate; the first Y-coordinate is determined according to parameters of an image acquisition device and a position of each sampling point in a sampling image where each sampling point is located; the first X-coordinate is determined according to projections, on an intermediate coordinate system, of border lines of the sampling image where each sampling point is located; and the intermediate coordinate system is a coordinate system established according to a current position of the target vehicle and a current driving direction of the target vehicle.

In some embodiments, determining the first Y-coordinate of each sampling point includes: determining a target sampling point and a target sampling image where the target sampling point is located, the target sampling point being a sampling point of a plurality of sampling points of the target sampling image, and the target sampling image being a sampling image of the N sampling images; establishing an image coordinate system of the target sampling image, an origin of the image coordinate system being a center point of the target sampling image, an X-axis of the image coordinate system being perpendicular to a left border line of the target sampling image or a right border line of the target sampling image, and a Y-axis of the image coordinate system being perpendicular to an upper border line of the target sampling image or a lower border line of the target sampling image; determining third coordinates of the target sampling point in the image coordinate system, the third coordinates of the target sampling point in the image coordinate system including a third Y-coordinate and a third X-coordinate, the third X-coordinate being an X-coordinate of the target sampling point of the image coordinate system, and the third Y-coordinate being a Y-coordinate of the target sampling point of the image coordinate system; and determining a first Y-coordinate of the target sampling point according to the parameters of the image acquisition device and the third Y-coordinate, the parameters of the image acquisition device including a vertical distance between the image acquisition device and a ground, a sampling angle of the image acquisition device, and a focal length of the image acquisition device, and the sampling angle of the image acquisition device being an included angle between an acquisition direction of the image acquisition device and a direction perpendicular to the ground.

In some embodiments, determining the first X-coordinate of each sampling point includes: establishing an intermediate coordinate system corresponding to the target sampling image, an origin of the intermediate coordinate system corresponding to the target sampling image being a current position of the target vehicle corresponding to the target sampling image, a positive direction of a Y-axis of the intermediate coordinate system corresponding to the target sampling image being a current driving direction of the target vehicle corresponding to the target sampling image, and an X-axis of the intermediate coordinate system corresponding to the target sampling image being parallel to the ground; determining a slope of a first straight line, a slope of a second straight line, and a target quantity, the first straight line being a straight line obtained by projecting the left border line of the target sampling image on the intermediate coordinate system corresponding to the target sampling image, the second straight line being a straight line obtained by projecting the right border line of the target sampling image on the intermediate coordinate system corresponding to the target sampling image, and the target quantity being a half of a number of sampling points of the target sampling image on the X-axis of the image coordinate system; and determining a first X-coordinate of the target sampling point according to the slope of the first straight line, the slope of the second straight line, the target quantity, the first Y-coordinate of the target sampling point, and the third X-coordinate.

In some embodiments, mapping the first coordinates of each sampling point onto the reference coordinate system to determine the second coordinates of each sampling point includes: mapping the first coordinates of each sampling point to an angle-restoration coordinate system to determine fourth coordinates of each sampling point, the angle-restoration coordinate system being a coordinate system obtained by rotating the intermediate coordinate system by a preset angle; and mapping the fourth coordinates of each sampling point to the reference coordinate system to determine the second coordinates of each sampling point.

In some embodiments, mapping the first coordinates of each sampling point to the angle-restoration coordinate system to determine the fourth coordinates of each sampling point includes: acquiring a deviation angle of the target vehicle, the deviation angle of the target vehicle being an included angle between the current driving direction of the target vehicle and a straight-line driving direction of the target vehicle; determining a preset angle of the target sampling image, the preset angle of the target sampling image being determined according to a deviation angle of the target vehicle within a sampling cycle of the target sampling image; rotating the target sampling image and an intermediate coordinate system corresponding to the target sampling image clockwise by the preset angle of the target sampling image to determine an angle-restored target sampling image and an angle-restoration coordinate system corresponding to the target sampling image; and determining coordinates of the target sampling point of the target sampling image after the angle-restoration in the angle-restoration coordinate system corresponding to the target sampling image as fourth coordinates of the target sampling point.

In some embodiments, mapping the fourth coordinates of each sampling point to the reference coordinate system to determine the second coordinates of each sampling point includes: establishing the reference coordinate system, an origin of the reference coordinate system being a position of the target vehicle within a sampling cycle of the preset sampling image, a positive direction of a Y-axis of the reference coordinate system being a driving direction of the target vehicle within the sampling cycle of the preset sampling image, and an X-axis of the reference coordinate system being parallel to the ground; determining a first distance difference and a second distance difference, the first distance difference being a distance difference between an origin of the angle-restoration coordinate system and the origin of the reference coordinate system in a direction of an X-axis of the angle-restoration coordinate system, and the second distance difference being a distance difference between the origin of the angle-restoration coordinate system and the origin of the reference coordinate system in a direction of a Y-axis of the angle-restoration coordinate system; and determining a second X-coordinate and a second Y-coordinate included in the second coordinates. The second X-coordinate is a difference between a fourth X-coordinate of the fourth coordinates and the first distance difference, and the second Y-coordinate is a difference between a fourth Y-coordinate of the fourth coordinate and the second distance difference.

In some embodiments, after synthesizing the sampling points of the N sampling images according to the second coordinates of the sampling points of the N sampling images to determine the target image, the method further includes: dividing a target area of the target image into P sampling points; determining fifth coordinates of each of the P sampling points in the reference coordinate system, the target area being an area whose pixels per inch (PPI) is lower than a preset PPI threshold, and P is a positive integer; determining a sampling point satisfying a preset condition from the sampling points of the N sampling images according to the fifth coordinates of the first sampling point, the first sampling point being a sampling point of the P sampling points; determining image information of the first sampling point according to image information of the sampling point satisfying the preset condition; and adding the image information of the first sampling point to image information of the target image according to the fifth coordinates of the first sampling point.

In some embodiments, storing the N sampling images includes: acquiring following distances within M sampling cycles, wherein a single sampling cycle corresponds to a single sampling image of the M sampling images; determining L sampling images according to the following distances within the M sampling cycles L being a positive integer less than or equal to M; determining the N sampling images from the L sampling images; and storing the N sampling images. Positions of the target vehicle corresponding to the N sampling images are different. The L sampling images satisfy following conditions: if following distances within an a-th sampling cycle to a b-th sampling cycle are all greater than a preset distance threshold, the L sampling images include sampling images within a 1st sampling cycle to the b-th sampling cycle a is a positive integer, and b is a positive integer greater than a; and a difference between a and b is greater than or equal to a first preset quantity threshold; if a number of following distances greater than the preset distance threshold of following distances within the 1st sampling cycle to a c-th sampling cycle is greater than a second preset quantity threshold, the L sampling images include sampling images within the 1st sampling cycle to the c-th sampling cycle; a value of c is determined according to the speed of the target vehicle or the current position of the target vehicle and c is a positive integer greater than 1; and if a forced synthesis switch is in a turned-on state, the L sampling images include the sampling images within the 1st sampling cycle to the c-th sampling cycle or sampling images within the 1st sampling cycle to a d-th sampling cycle; a value of d is determined according to the speed of the target vehicle or the current position of the target vehicle; and d is a positive integer greater than c.

In some embodiments, after synthesizing the sampling points of the N sampling images according to the second coordinates of the sampling points of the N sampling images to determine the target image, the method further includes: determining a driving assistance line according to the target image and driving information of the target vehicle; and adding the driving assistance line to the target image.

In some embodiments, the first Y-coordinate satisfies a formula:

$$Y_1 = \tan(\arctan(Y_3/Ob) + \beta) \times h$$

$Y_1$ is the first Y-coordinate; $Y_3$ is the third Y-coordinate; Ob is the focal length of the image acquisition device; $\beta$ is the sampling angle of the image acquisition device; and h is the vertical distance between the image acquisition device and the ground.

In some embodiments, the first X-coordinate satisfies a formula:

$$X_1 = X_3 \times (((Y_1 - f)/k)/J)$$

$X_1$ is the first X-coordinate; $X_3$ is the third X-coordinate; $Y_1$ is the first Y-coordinate; f is the slope of the first straight line; k is the slope of the second straight line; and J is the target quantity.

In a second aspect, some embodiments of the present disclosure provide a vehicle navigation image synthesis device. The device includes a processor and a communication interface. The processor is coupled to the communication interface. The processor is configured to execute a computer program or instructions to implement: acquiring M sampling images; storing N sampling images; determining a plurality of sampling points of each sampling image of the N sampling images; determining first coordinates of each sampling point of the plurality of sampling points of each sampling image; mapping the first coordinates of each sampling point to the reference coordinate system to determine second coordinates of each sampling point; and synthesizing sampling points of the N sampling images according to second coordinates of the sampling points of the N sampling images to determine a target image. The M sampling images include a preset sampling image for establishing a reference coordinate system, and M is a positive integer; N is a positive integer less than or equal to M, a value of N is determined according to a speed of a target vehicle, a position of the target vehicle, and a following distance of the target vehicle; the first coordinates include a first Y-coordinate and a first X-coordinate; the first Y-coordinate is determined according to parameters of an image acquisition device and a position of each sampling point in a sampling image where each sampling point is located; the first X-coordinate is determined according to projections, on an intermediate coordinate system, of border lines of the sampling image where each sampling point is located; and the intermediate coordinate system is a coordinate system established according to a current position of the target vehicle and a current driving direction of the target vehicle.

In a third aspect, some embodiments of the present disclosure provide a non-transitory computer-readable storage medium. The non-transitory computer-readable storage medium stores instructions, and when the instructions are executed by a computer, the computer implements the vehicle navigation image synthesis method as described in the above first aspect.

BRIEF DESCRIPTION OF THE DRAWINGS

In order to describe technical solutions in the present disclosure more clearly, accompanying drawings to be used in some embodiments of the present disclosure will be introduced briefly below. However, the accompanying drawings to be described below are merely accompanying drawings of some embodiments of the present disclosure, and a person of ordinary skill in the art can obtain other drawings according to these drawings. In addition, the accompanying drawings in the following description may be regarded as schematic diagrams, and are not limitations on actual sizes of products, actual processes of methods and actual timings of signals involved in the embodiments of the present disclosure.

DETAILED DESCRIPTION

Figure 1:
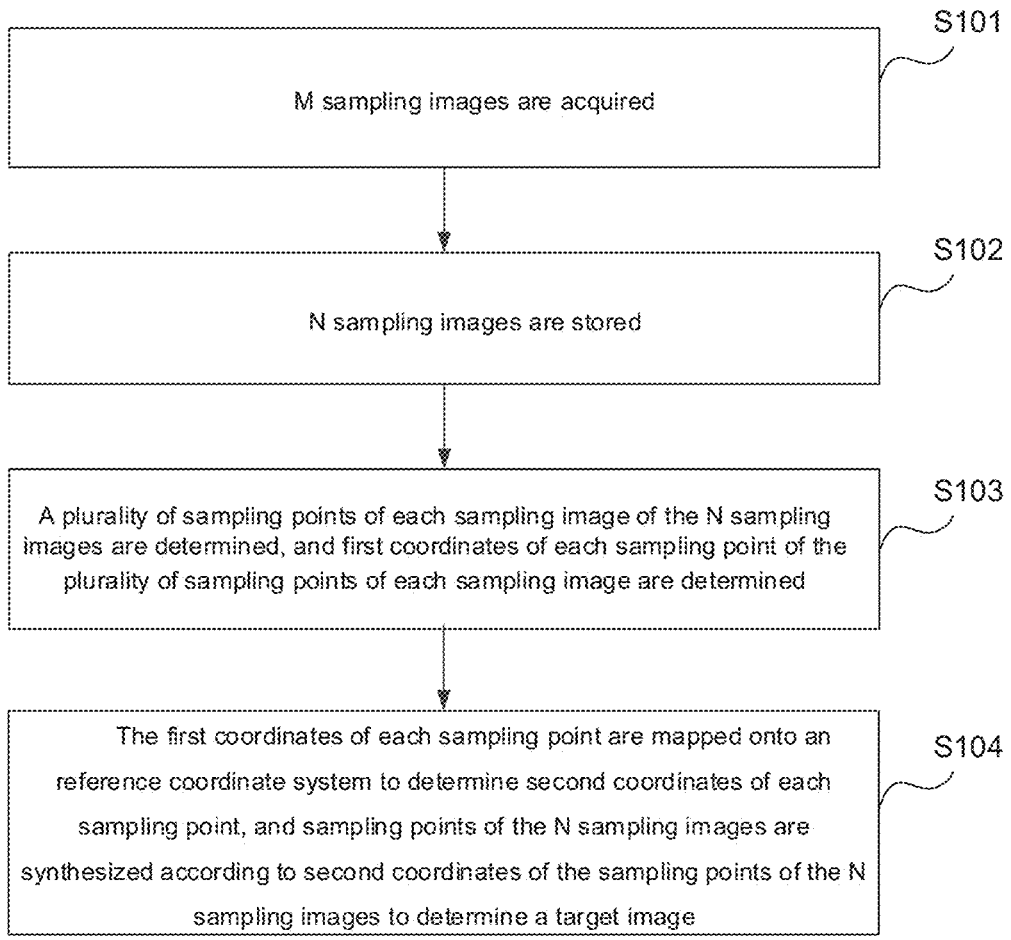
FIG. 1 is a flow diagram of a vehicle navigation image synthesis method, in accordance with some embodiments of the present disclosure.

Technical solutions in some embodiments of the present disclosure will be described clearly and completely below with reference to accompanying drawings. However, the described embodiments are merely some but not all embodiments of the present disclosure. All other embodiments acquired by a person of ordinary skill in the art based on the embodiments of the present disclosure shall be included in the protection scope of the present disclosure.

Unless the context requires otherwise, throughout the specification and the claims, the term "comprise" and other forms thereof such as the third-person singular form "comprises" and the present participle form "comprising" are construed as an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, a feature defined with "first" or "second" may explicitly or implicitly include one or more of the features. In the description of the embodiments of the present disclosure, the term "a plurality of" or "the plurality of" means two or more unless otherwise specified.

In the description of some embodiments, the terms such as "coupled" and derivatives thereof may be used. For example, the term "coupled" may be used to indicate that two or more components are in direct physical or electrical contact. The term "coupled" or "communicatively coupled" may also mean that two or more components are not in direct contact with each other, but still cooperate or interact with each other. The embodiments disclosed herein are not necessarily limited to the content herein.

The phrase "A and/or B" includes the following three combinations: only A, only B, and a combination of A and B.

The phrase "configured to" as used herein is meant to be open and inclusive, which does not exclude devices that are applicable to or configured to perform additional tasks or steps.

In addition, the phrase "based on" as used herein is meant to be open and inclusive, since a process, a step, a calculation or other action that is "based on" one or more of the stated conditions or values may, in practice, be based on additional conditions or values exceeding those stated.

The term such as "about," "substantially," or "approximately" as used herein includes a stated value and an average value within an acceptable range of deviation of a particular value. The acceptable range of deviation is determined by a person of ordinary skill in the art in view of measurement in question and errors associated with measurement of a particular quantity (i.e., limitations of a measurement system).

It will be noted that, in the embodiments of the present disclosure, the word such as "exemplary" or "for example" are used as examples, instances or illustrations. Any embodiment or design described as "exemplary" or "for example" in the embodiments of the present disclosure shall not be construed as being more preferred or more advantageous than other embodiments or designs. Rather, the use of word such as "exemplary" or "for example" is intended to present related concepts in a concrete manner.

In the description of the present disclosure, the term "a plurality of" or "the plurality of" means two or more unless otherwise specified.

Some embodiments of the present disclosure provide a vehicle navigation image synthesis method, so as to determine image information of the entire junction in a case where there is no navigation map data or a vehicle-mounted camera cannot acquire the image information of the entire junction at once. For example, an execution subject of the vehicle navigation image synthesis method may be any electronic device with a processing capability in the vehicle, or a component of an electronic device (such as a chip or a processor), and the present disclosure does not limit the execution subject of the method. It will be noted that, the following embodiments will be illustrated by considering an example where the execution subject of the method is the vehicle navigation image synthesis device. In addition, the structure of the vehicle navigation image synthesis device will be described in subsequent embodiments. As shown in FIG. 1, the method includes S101 to S104.

In S101, M sampling images are acquired.

The M sampling images include a preset sampling image for establishing a reference coordinate system. M is a positive integer.

It will be noted that the vehicle navigation image synthesis device may cyclically acquire images. For example, a sampling cycle is 10 ms, the vehicle navigation image synthesis device may acquire an image every 10 ms. In a case where the vehicle navigation image synthesis device acquires a preset sampling image within a sampling cycle, the sampling cycle may be referred to a sampling cycle of the preset sampling image. For example, the reference coordinate system may be determined according to a position of a target vehicle within the sampling cycle of the preset sampling image and a driving direction of the target vehicle within the sampling cycle of the preset sampling image.

It will be pointed out that, the preset sampling image for establishing the reference coordinate system may be a sampling image in which a stop line is acquired for a first time, or the preset sampling image for establishing the reference coordinate system may be a sampling image in which a zebra crossing is acquired for a first time. The preset sampling image may also be other sampling image, which is not limited in the present disclosure.

In S102, N sampling images are stored.

N is a positive integer less than or equal to M. A value of N is determined according to a speed of the target vehicle, a position of the target vehicle, and a following distance of the target vehicle.

It can be understood that, the vehicle navigation image synthesis device may delete repeated sampling images of the acquired M sampling images in the process of storing the sampling images. For example, if there are a plurality of repeated sampling images in the M sampling images, the vehicle navigation image synthesis device may only retain a latest sampling image of the plurality of repeated sampling images.

In S103, a plurality of sampling points of each sampling image of the N sampling images are determined, and first coordinates of each sampling point of the plurality of sampling points of each sampling image are determined.

The first coordinates include a first Y-coordinate and a first X-coordinate. The first Y-coordinate is determined according to parameters of an image acquisition device and a position of each sampling point in a sampling image where the sampling point is located. The first X-coordinate is determined according to projections, on an intermediate coordinate system, of border lines of the sampling image where the sampling point is located. The intermediate coordinate system is a coordinate system established according to a current position of the target vehicle and a current driving direction of the target vehicle.

In some embodiments, the vehicle navigation image synthesis device may divide the sampling image into R×S grids, and determine the plurality of sampling points of the sampling image according to the R×S grids. Each of the R×S grids may be used to represent a sampling point.

It will be noted that, since the intermediate coordinate system is determined according to the current position and current driving direction of the target vehicle, if the current positions and/or driving directions of the target vehicle corresponding to the N sampling images are different, intermediate coordinate systems corresponding to the N sampling images are different.

For example, the vehicle navigation image synthesis device may remove invalid information of each sampling image of the N sampling images. The invalid information may include at least one of: image information of other vehicles except the target vehicle, and image information of pedestrian(s).

Figure 2:
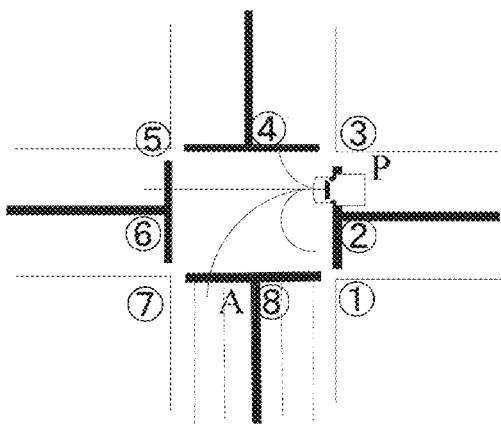
FIG. 2 is a schematic diagram of a junction image, in accordance with some embodiments of the present disclosure.

For example, FIG. 2 shows an image of a junction. Positions marked by ①, ③, ⑤, and ⑦ in FIG. 2 are curbs of roads, positions marked by ②, ④, ⑥, and ⑧ in FIG. 2 are median strips, P in FIG. 2 represents the position of the target vehicle, and A in FIG. 2 is a limit point of a vehicle driving range between ⑦ and ⑧ in FIG. 2.

In S104, the first coordinates of each sampling point are mapped to the reference coordinate system to determine second coordinates of each sampling point; and sampling points of the N sampling images are synthesized according to second coordinates of the sampling points of the N sampling images to determine a target image.

It will be noted that, in the process of synthesizing the plurality of sampling points according to the second coordinates of each sampling point, the vehicle navigation image synthesis device may process image information of the plurality of sampling points according to a principle that an object looks small in the distance and big on the contrary, so as to determine the target image.

In an example, the image acquisition device is a camera.

The above technical solution brings at least the following beneficial effects. In the vehicle navigation image synthesis method provided in the embodiments of the present disclosure, first coordinates of the plurality of sampling points of each sampling image of the N sampling images in a corresponding real-world coordinate system (i.e., the intermediate coordinate system) may be obtained according to positions of the plurality of sampling points of each sampling image of the N sampling images, and then the first coordinates of the plurality of sampling points of each sampling image are mapped onto the reference coordinate system to determine second coordinates of the plurality of sampling points. In this way, all sampling points of a plurality of sampling images may be transformed into the same coordinate system (i.e., the reference coordinate system). The plurality of sampling images in the same coordinate system may be directly superimposed to obtain an image of the entire junction (i.e., the target image). It can be seen from the above that the vehicle navigation image synthesis method provided in the embodiments of the present disclosure may synthesize N incomplete images (i.e., images blocked by a vehicle in front) into a complete image, so as to determine the image of the entire junction according to the complete image. Therefore, even if there is no navigation map data or the vehicle-mounted camera cannot acquire the image information of the entire junction at once, the image information of the entire junction may also be determined through the vehicle navigation image synthesis method. As a result, a vehicle-mounted system may provide a user with reliable driving assistance based on the image information of the entire junction, which may improve the driving safety of the vehicle and reduce the difficulty of driving the vehicle by a driver.

Figure 3:
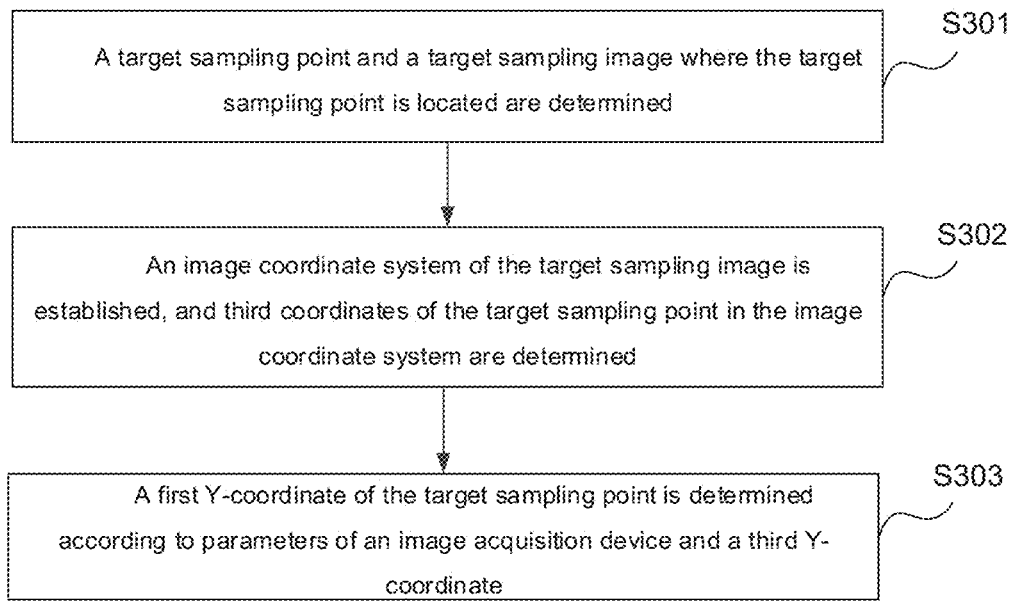
FIG. 3 is a flow diagram of another vehicle navigation image synthesis method, in accordance with some embodiments of the present disclosure.

In some embodiments, as shown in FIG. 3, as for details of an implementation of determining the first Y-coordinate of the sampling point by the vehicle navigation image synthesis device in S103, reference may be made to S301 to S303.

In S301, a target sampling point and a target sampling image where the target sampling point is located are determined.

Figure 4:
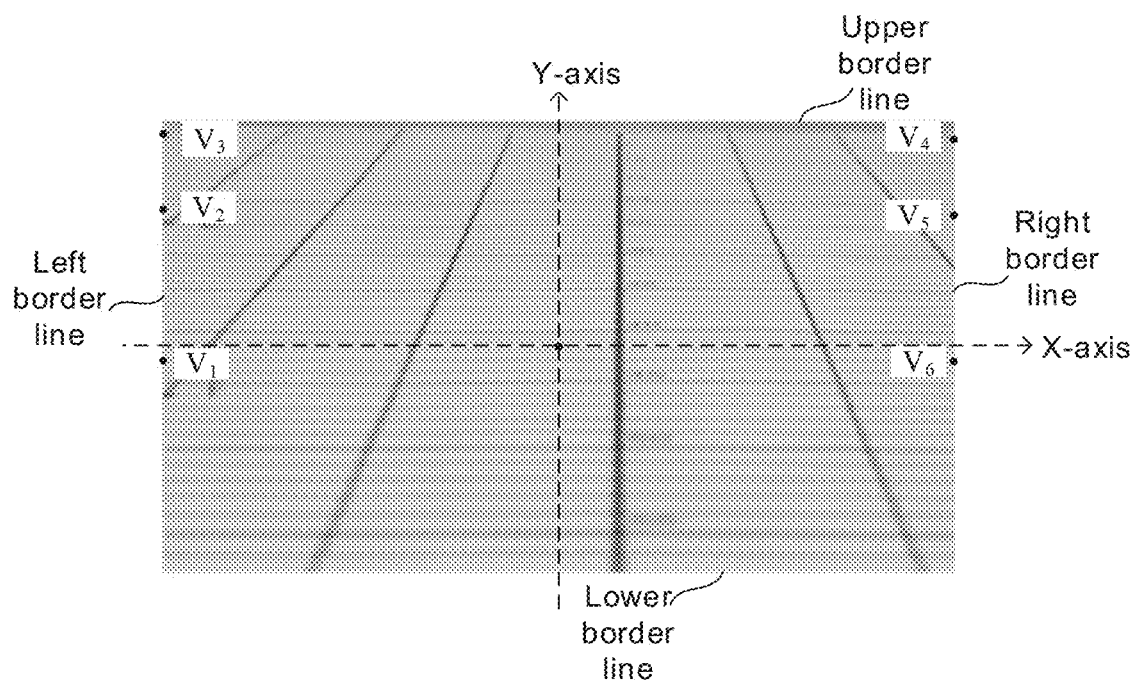
FIG. 4 is a schematic diagram of a sampling image, in accordance with some embodiments of the present disclosure.

The target sampling point is any one of the plurality of sampling points of the target sampling image. The target sampling image is any one of the N sampling images. For example, the target sampling image is shown in FIG. 4.

In S302, an image coordinate system of the target sampling image is established, and third coordinates of the target sampling point in the image coordinate system are determined.

An origin of the image coordinate system is a central point of the target sampling image. The X-axis of the image coordinate system is perpendicular to a left border line of the target sampling image or a right border line of the target sampling image. The Y-axis of the image coordinate system is perpendicular to an upper border line of the target sampling image or a lower border line of the target sampling image. The third coordinates of the target sampling point in the image coordinate system include a third Y-coordinate and a third X-coordinate. The third X-coordinate is an X-coordinate of the target sampling point of the image coordinate system. The third Y-coordinate is a Y-coordinate of the target sampling point of the image coordinate system. For example, as shown in FIG. 4, the left border line of the target sampling image is a border line where points $V_4$, $V_5$ and $V_6$ are located, and the right border line of the target sampling image is a border line where points $V_4$, $V_5$ and $V_6$ are located.

In S303, a first Y-coordinate of the target sampling point is determined according to the parameters of the image acquisition device and the third Y-coordinate.

The parameters of the image acquisition device include: a vertical distance between the image acquisition device and the ground, a sampling angle of the image acquisition device, and a focal length of the image acquisition device. The sampling angle of the image acquisition device is an included angle between an acquisition direction of the image acquisition device and a direction perpendicular to the ground.

In some embodiments, the first Y-coordinate satisfies the Formula 1:

$$Y_1 = \tan(\arctan(Y_3/Ob) + \beta) \times h \qquad \text{Formula 1}$$

Here, $Y_1$ is the first Y-coordinate; $Y_3$ is the third Y-coordinate; Ob is the focal length of the image acquisition device; β is the sampling angle of the image acquisition device; and H is the vertical distance between the image acquisition device and the ground.

Figure 5:
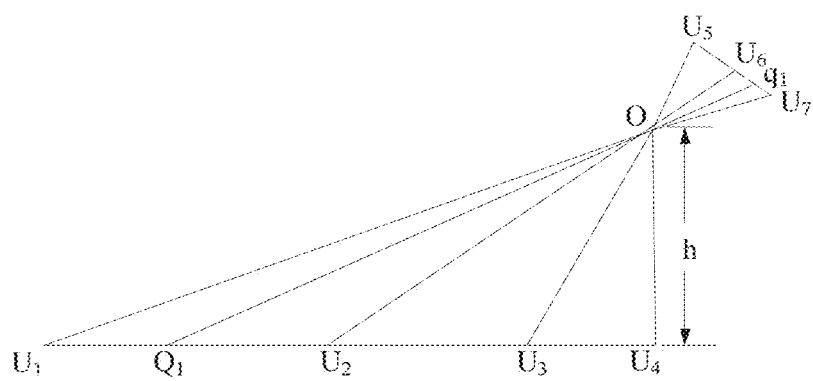
FIG. 5 is a schematic diagram of a plurality of parameters for determining a first Y-coordinate, in accordance with some embodiments of the present disclosure.

For convenience of understanding, in some embodiments of the present disclosure, an illustration of the parameters for determining the first Y-coordinate is provided. As shown in FIG. 5, the line segment $OU_4$ represents the vertical distance (i.e., h) between the image acquisition device and the ground. The direction of the line segment $OU_2$ represents the acquisition direction of the image acquisition device, and the direction of the line segment $OU_4$ represents a direction perpendicular to the ground; $\angle U_2OU_4$ is the sampling angle (i.e., β) of the image acquisition device; and the line segment $OU_6$ represents the focal length of the image acquisition device.

The explanation of other parameters in FIG. 5 is as follows. The point O represents the position of the image acquisition device; the line segment $U_1U_3$ represents an image acquisition range (i.e., a sampling range) of the image acquisition device; the line segment $U_3U_4$ represents a blind spot of the image acquisition device; the line segment $U_5U_7$ represents a photosensitive device of the image acquisition device; the point $U_6$ represents a midpoint of the photosensitive device of the image acquisition device; the point $Q_1$ is the position of the target sampling point on the ground; the point $q_1$ represents the position of the target sampling point on the photosensitive device; $\angle U_1OU_3$ represents an viewing angle of the image acquisition device. In addition; and $\angle U_2OU_3$ represents an overlapping portion of the viewing angle and the sampling angle of the image acquisition device.

The above technical solution brings at least the following beneficial effects. In the vehicle navigation image synthesis method provided in the embodiments of the present disclosure, the image coordinate system may be determined on the sampling image, and the third coordinates of the target sampling point in the image coordinate system may be determined, and it is also possible to determine a Y-coordinate of the target sampling point of the intermediate coordinate system (i.e., a first Y-coordinate) according to the third coordinates of the target sampling point and the parameters of the image acquisition device. As a result, the third coordinates of the sampling point of the sampling image may be transformed into first coordinates of a sampling point of a real junction image, which is convenient to add image information of the sampling image to the image information of the real junction according to coordinates of the sampling point of the real junction image.

Figure 6:
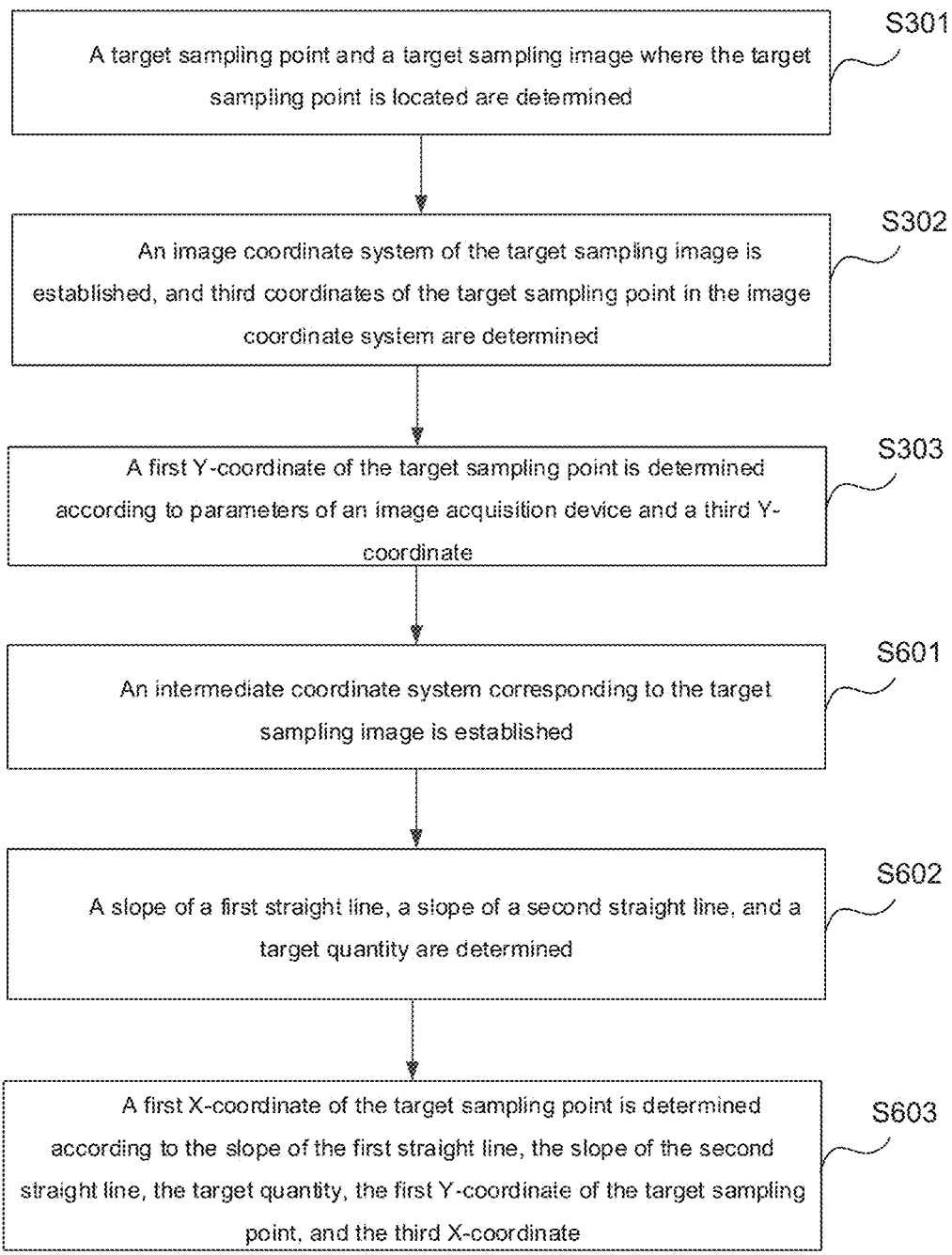
FIG. 6 is a flow diagram of yet another vehicle navigation image synthesis method, in accordance with some embodiments of the present disclosure.

In some embodiments, as shown in FIG. 6, as for details of an implementation of determining the first X-coordinate of the sampling point by the vehicle navigation image synthesis device in S103, reference may be made to S601 to S603.

In S601, an intermediate coordinate system corresponding to the target sampling image is established.

An origin of the intermediate coordinate system corresponding to the target sampling image is a current position of the target vehicle corresponding to the target sampling image, a positive direction of a Y-axis of the intermediate coordinate system corresponding to the target sampling image is a current driving direction of the target vehicle corresponding to the target sampling image, and an X-axis of the intermediate coordinate system corresponding to the target sampling image is parallel to the ground.

In S602, a slope of a first straight line, a slope of a second straight line, and a target quantity are determined.

The first straight line is a straight line obtained by projecting the left border line of the target sampling image on the intermediate coordinate system corresponding to the target sampling image. The second straight line is a straight line obtained by projecting the right border line of the target sampling image on the intermediate coordinate system corresponding to the target sampling image. The target quantity is a half of the number of sampling points of the target sampling image on the X-axis of the image coordinate system corresponding to the target sampling image.

Figure 7:
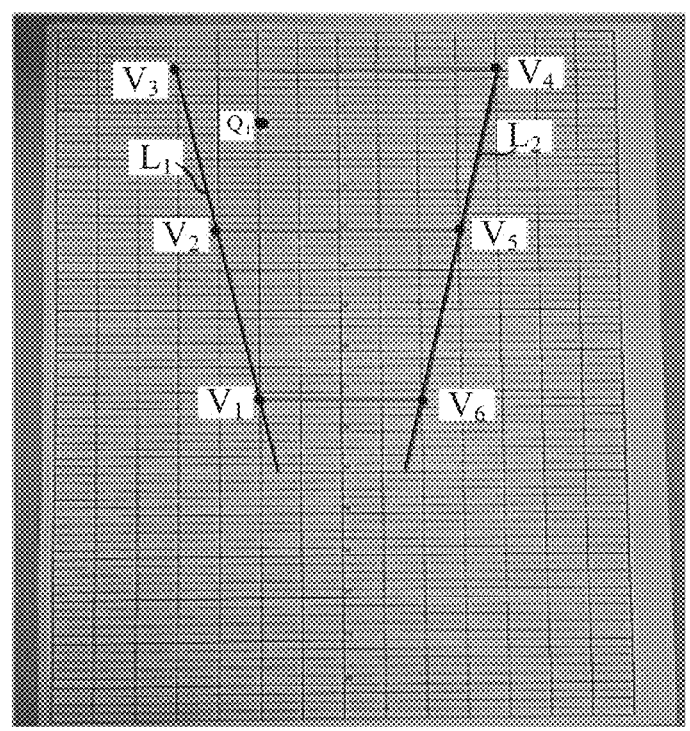
FIG. 7 is a schematic diagram illustrating a first straight line and a second straight line, in accordance with some embodiments of the present disclosure.

For example, FIG. 7 illustrates the intermediate coordinate system. The line $L_1$ in FIG. 7 represents the first straight line, the line $L_2$ in FIG. 7 represents the second straight line, and the point $Q_1$ in FIG. 7 represents the target sampling point.

It will be noted that, the implementation of determining the slope of the first straight line by the vehicle navigation image synthesis device may be that: the vehicle navigation image synthesis device determines coordinates of any two points of the first straight line in the intermediate coordinate system, and then determines the slope of the first straight line according to the coordinates of the two points in the intermediate coordinate system.

Considering an example in which any two points of the first straight line are points $V_1$ and $V_2$, the slope of the first straight line satisfies the Formula 3:

$$L_{11}=(Y_4-Y_5)/(X_4-X_5) \quad \text{Formula 3}$$

Here, $L_{11}$ is the slope of the first straight line; the coordinates of the point $V_1$ in the intermediate coordinate system are $(X_4, Y_4)$; and the coordinates of the point $V_2$ in the intermediate coordinate system are $(X_5, Y_5)$.

If the first straight line and the second straight line are symmetrical about the Y-axis of the intermediate coordinate system, the slope $L_{21}$ of the second straight line may satisfies the Formula 4:

$$L_{21}=Y_4-(Y_4-Y_5)/(X_4-X_5)\times X_4 \quad \text{Formula 4}$$

If the first straight line and the second straight line are not symmetrical about the Y-axis of the intermediate coordinate system, then as for the process of determining the slope of the second straight line, reference may be made to the process of determining the slope of the first straight line, and details will not be repeated here.

In S603, a first X-coordinate of the target sampling point is determined according to the slope of the first straight line, the slope of the second straight line, the target quantity, the first Y-coordinate of the target sampling point, and the third X-coordinate.

In some embodiments, the first X-coordinate satisfies the Formula 2:

$$X_1=X_3\times(((Y_1-f)/k)/J) \quad \text{Formula 2}$$

Here, $X_1$ is the first X-coordinate, $X_3$ is the third X-coordinate, F is the slope of the first straight line, K is the slope of the second straight line, and J is the target quantity.

It will be noted that, since the sampling range of the image acquisition device is certain, the border lines (e.g., the left border line and the right border line) of the sampling image are determined according to the position of the target vehicle. In addition, the border lines of the sampling image are also called sampling border lines of the image acquisition device.

The above technical solution brings at least the following beneficial effects. In the vehicle navigation image synthesis method provided in the embodiments of the present disclosure, slopes of projections of sampling border lines of the image acquisition device in the intermediate coordinate system (i.e., the slope of the first straight line and the slope of the second straight line) and half of the number of sampling points of the sampling image on the X-axis of the image coordinate system (i.e., the target quantity) may be determined, and the first X-coordinate may be determined according to the slope of the first straight line, the slope of the second straight line, the target quantity, the first Y-coordinate, and the third X-coordinate. Therefore, the third coordinates of the sampling point of the sampling image may be transformed into first coordinates of a sampling point of the real junction image, which is convenient to add the image information of the sampling image to the image information of the real junction according to the coordinates of the sampling points in the real junction image.

Figure 8:
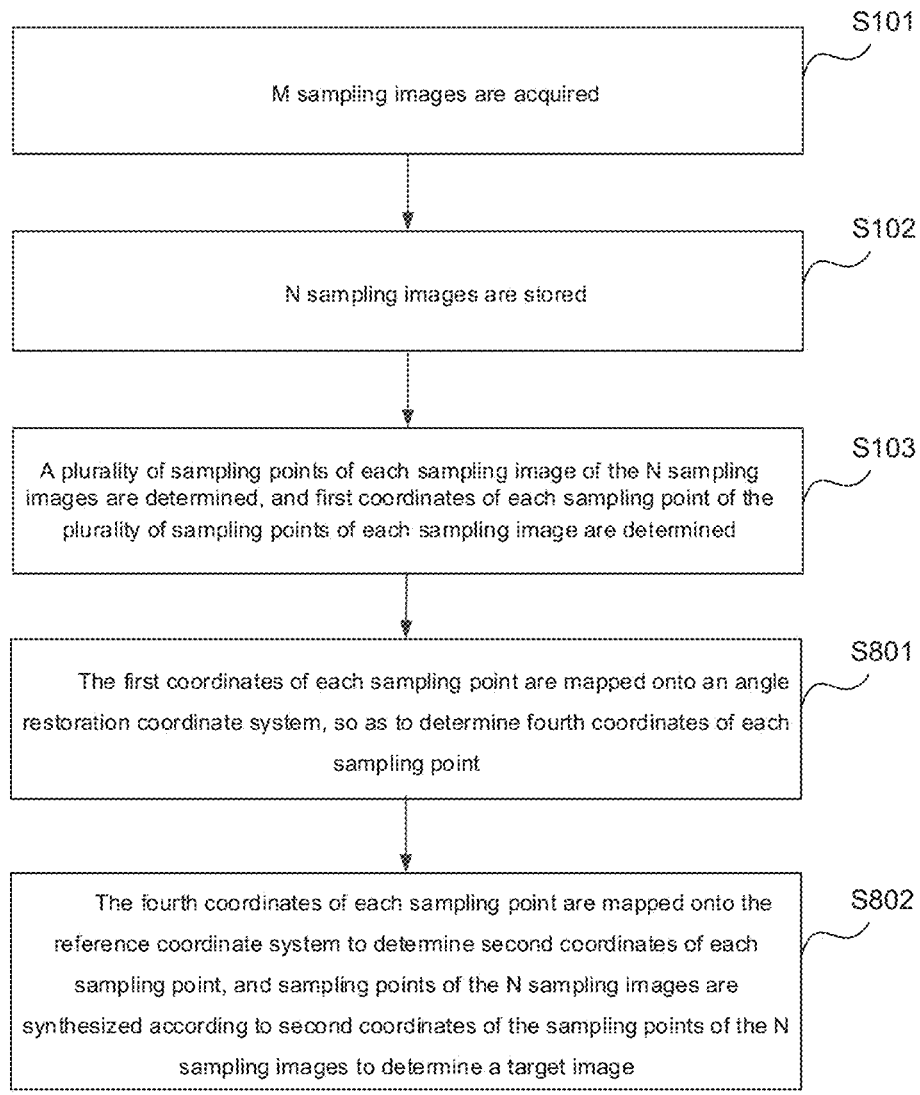
FIG. 8 is a flow diagram of yet another vehicle navigation image synthesis method, in accordance with some embodiments of the present disclosure.

In some embodiments, in combination with FIGS. 1 and 8, as for details of an implementation of the S104, reference may be made to S801 to S802.

In S801, the first coordinate of each sampling point is mapped to an angle-restoration coordinate system, so as to determine fourth coordinates of each sampling point.

The angle-restoration coordinate system is a coordinate system obtained by rotating the intermediate coordinate system by a preset angle.

For example, before synthesizing the plurality of sampling points according to the second coordinates of each sampling point to determine the target image, if there are repeated sampling points in the plurality of sampling points of the N sampling images, the vehicle navigation image synthesis device may filter the plurality of sampling points of the N sampling images to delete the repeated sampling points in the plurality of sampling points. In this case, the vehicle navigation image synthesis device synthesizes the plurality of sampling points for determining the target image according to second coordinates of remaining sampling points after the filtering process.

It will be pointed out that the repeated sampling points may include at least one of: sampling points with the same feature of a curb and sampling points with the same feature of a barricade. The above is only an exemplary description of the repeated sampling points, and the repeated sampling points may also include other sampling points, which is not limited in the present disclosure.

It will be noted that the preset angle may be determined according to the current driving direction of the target vehicle and a straight-line driving direction of the target vehicle. For example, the straight-line driving direction of the target vehicle may be a driving direction of the target vehicle within the sampling cycle of the preset sampling image.

It will be pointed out that the fourth coordinates may include a fourth X-coordinate and a fourth Y-coordinate. The fourth X-coordinate is an X-coordinate of the sampling point of the angle-restoration coordinate system. The fourth Y-coordinate is a Y-coordinate of the sampling point of the angle-restoration coordinate system.

In S802, the fourth coordinates of each sampling point are mapped to the reference coordinate system to determine the second coordinates of each sampling point, and the plurality of sampling points are synthesized according to the second coordinates of each sampling point to determine the target image.

In some embodiments, the vehicle navigation image synthesis device may first synthesize an image composed of the plurality of sampling points according to the second coordinates of the plurality of sampling points of each sampling image, determine a plurality of sampling images in the reference coordinate system, and then superimpose the plurality of sampling images in the reference coordinate system to obtain the target image.

Figure 9:
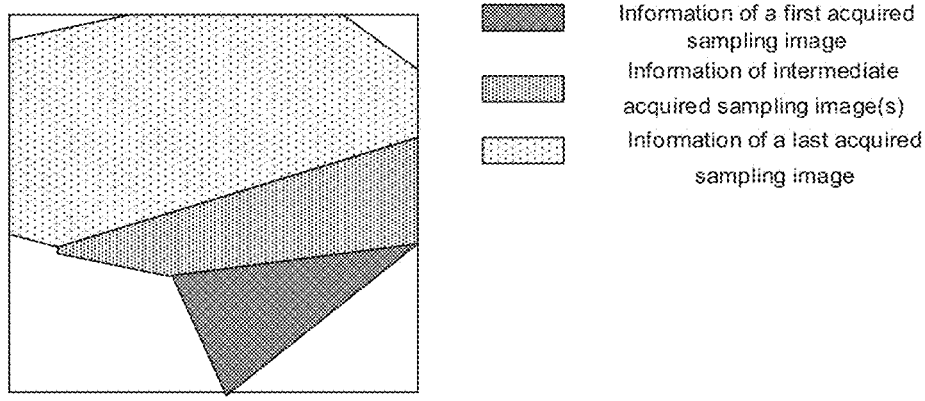
FIG. 9 is a schematic diagram of a target image obtained after superimposition of a plurality of sampling images, in accordance with some embodiments of the present disclosure.

For example, FIG. 9 shows the target image obtained by superimposing the plurality of sampling images.

The above technical solution brings at least the following beneficial effects. In the vehicle navigation image synthesis method provided in the embodiments of the present disclosure, the coordinates of each sampling point may be restored to a corresponding intermediate coordinate system to determine the fourth coordinates of each sampling point, and then the fourth coordinates of each sampling point are mapped onto the reference coordinate system to determine the second coordinates of each sampling point. Since the obtained second coordinates of all sampling points of the N sampling images are located in a same coordinate system, the vehicle navigation image synthesis device may synthesize all sampling points of the N sampling images according to the second coordinates of all sampling points of the N sampling images to determine the target image. In this way, the determined target image is not confused, and is closer to the real junction image.

Figure 10:
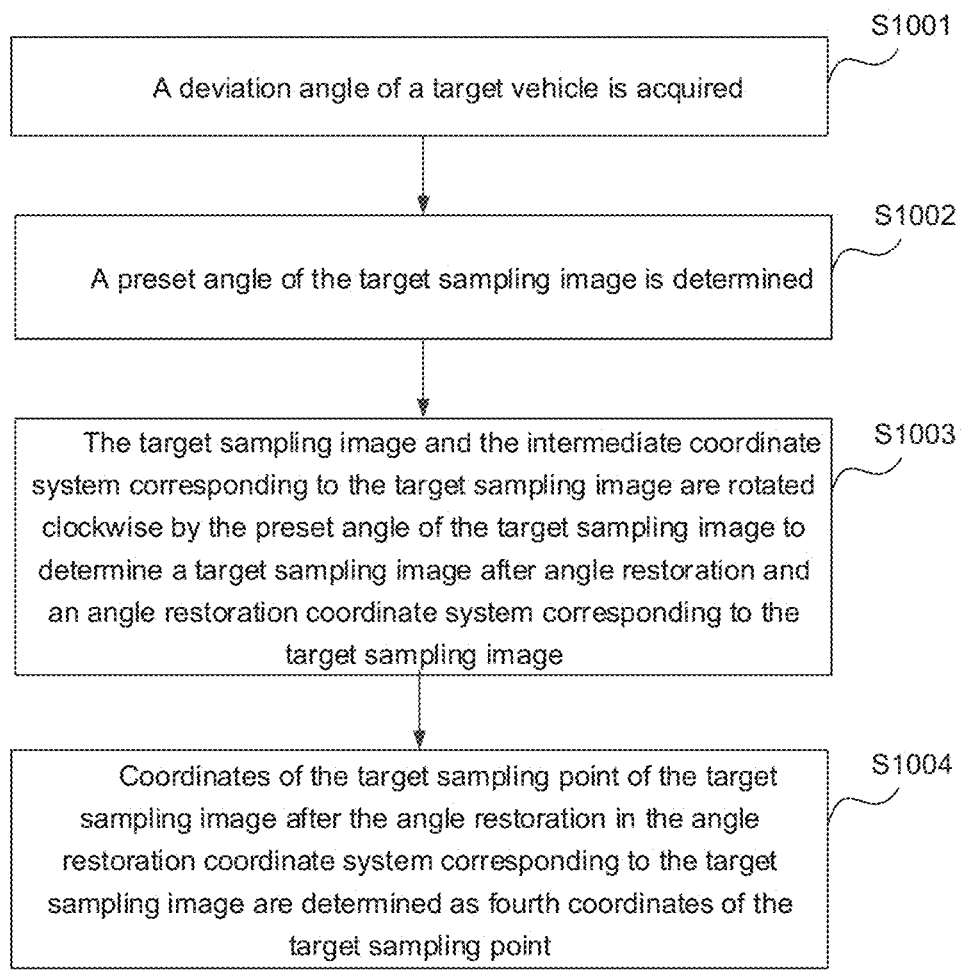
FIG. 10 is a flow diagram of yet another vehicle navigation image synthesis method, in accordance with some embodiments of the present disclosure.

In some embodiments, as shown in FIG. 10, as for details of an implementation of the S801, reference may be made to S1001 to S1004.

In S1001, a deviation angle of the target vehicle is acquired.

The deviation angle of the target vehicle is an included angle between the current driving direction of the target vehicle and the straight-line driving direction of the target vehicle.

In an example, the vehicle navigation image synthesis device may acquire the deviation angle of the target vehicle through a gyroscope sensor.

In S1002, a preset angle of the target sampling image is determined.

The preset angle of the target sampling image is determined according to the deviation angle of the target vehicle within the sampling cycle of the target sampling image.

In S1003, the target sampling image and the intermediate coordinate system corresponding to the target sampling image are rotated clockwise by the preset angle of the target sampling image to determine angle-restored target sampling image and an angle-restoration coordinate system corresponding to the target sampling image.

In S1004, coordinates of the target sampling point of the target sampling image in the angle-restoration coordinate system corresponding to the target sampling image are determined as fourth coordinates of the target sampling point.

Figure 11A:
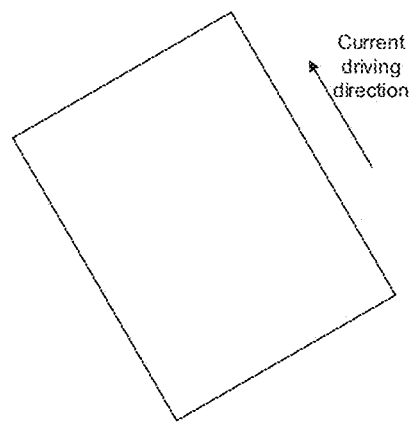
FIG. 11A is a simplified diagram of a sampling image, in accordance with some embodiments of the present disclosure.
Figure 11B:
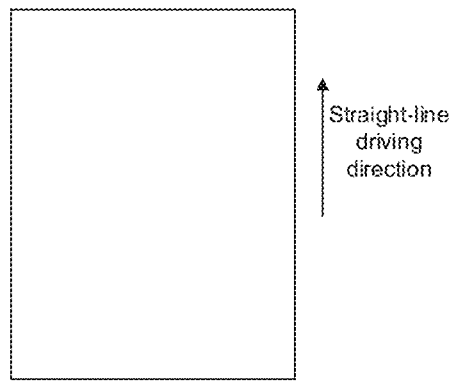
FIG. 11B is a simplified diagram of another sampling image, in accordance with some embodiments of the present disclosure.

For example, FIG. 11A is a simplified diagram of a sampling image acquired by the image acquisition device when the target vehicle drives in the current driving direction (i.e., the target vehicle turns left). FIG. 11B is a simplified diagram of a sampling image acquired by the image acquisition device when the target vehicle drives in the straight-line driving direction.

It will be noted that, if the sampling image shown in FIG. 11A and the sampling image shown in FIG. 11B are directly synthesized, the sampling points at the same position cannot be synthesized at the same position, which will cause image synthesis confusion. Therefore, a synthesis device 2204 is required to rotate the sampling image shown in FIG. 11A and the sampling image shown in FIG. 11B to be at the same angle.

The above technical solution brings at least the following beneficial effects. In the vehicle navigation image synthesis method provided in the embodiments of the present disclosure, the target sampling image and the intermediate coordinate system corresponding to the angle-restored target sampling image may be rotated clockwise by the preset angle of the target sampling image, and the coordinates of the target sampling point of the target sampling image after the angle-restoration in the angle-restoration coordinate system corresponding to the target sampling image are determined as the fourth coordinates of the target sampling point. In this way, it may avoid the confusion of the target image caused by synthesizing the sampling images from different angles. As a result, the obtained target image is closer to the real junction image.

Figure 12:
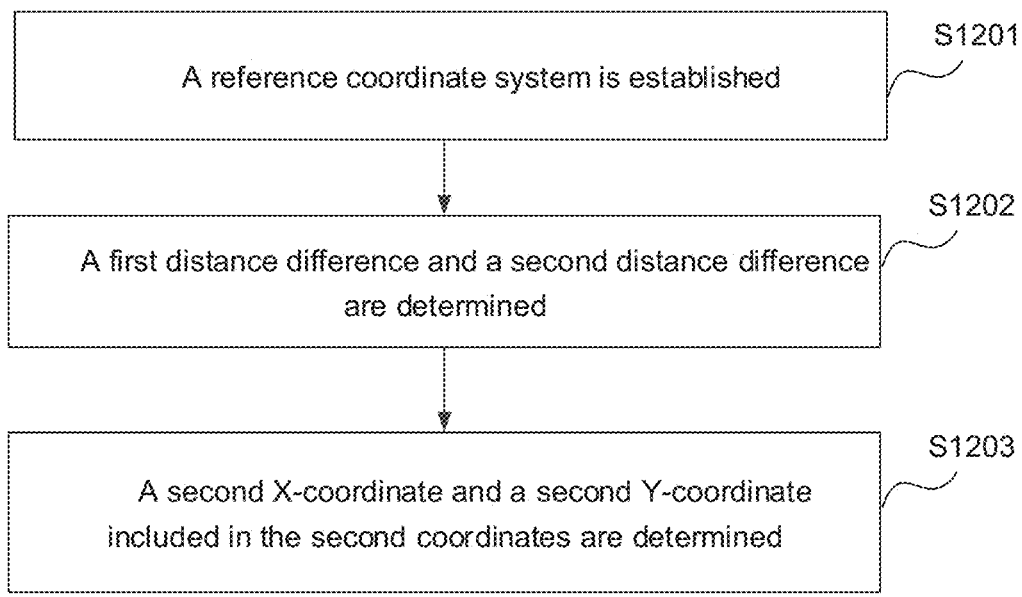
FIG. 12 is a flow diagram of yet another vehicle navigation image synthesis method, in accordance with some embodiments of the present disclosure.

In some embodiments, in combination with FIG. 10, as shown in FIG. 12, as for details of an implementation of the S802, reference may be made to S1201 to S1203.

In S1201, the reference coordinate system is established.

An origin of the reference coordinate system is the position of the target vehicle within the sampling cycle of the preset sampling image. A positive direction of the Y-axis of the reference coordinate system is the driving direction of the target vehicle within the sampling cycle of the preset sampling image. The X-axis of the reference coordinate system is parallel to the ground.

In S1202, a first distance difference and a second distance difference are determined.

The first distance difference is a distance difference between the origin of the angle-restoration coordinate system and the origin of the reference coordinate system in a direction of the X-axis of the angle-restoration coordinate system. The second distance difference is a distance difference between the origin of the angle-restoration coordinate system and the origin of the reference coordinate system in a direction of the Y-axis of the angle-restoration coordinate system.

In S1203, a second X-coordinate and a second Y-coordinate included in the second coordinates are determined.

The second X-coordinate is a difference between the fourth X-coordinate of the fourth coordinates and the first distance difference. The second Y-coordinate is a difference between the fourth Y-coordinate of the fourth coordinates and the second distance difference.

Figure 13:
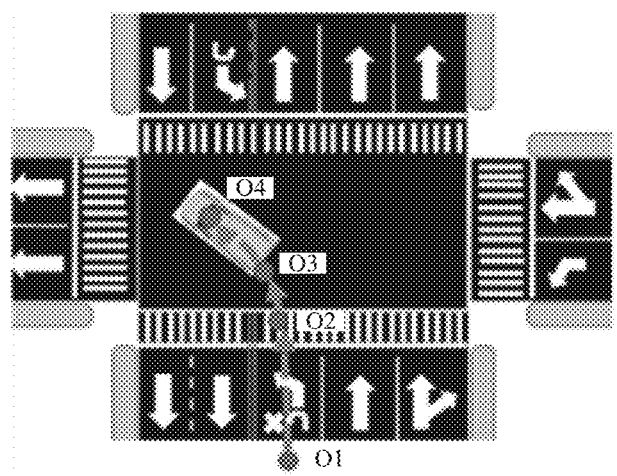
FIG. 13 is a diagram illustrating positions of origins of intermediate coordinate systems, in accordance with some embodiments of the present disclosure.

It will be noted that in the driving process of the target vehicle, the position of the target vehicle will change. As a result, origins of intermediate coordinate systems corresponding to the N sampling images acquired at different positions are not at the same position. As shown in FIGS. 13, O1, O2, O3 and O4 are used to represent origins of intermediate coordinate systems corresponding to four sampling images acquired at different positions, respectively. In this case, the synthesis device 2204 needs to transform the coordinates of each sampling point into coordinates in the same coordinate system (i.e., the reference coordinate system).

The above technical solution brings at least the following beneficial effects. In the vehicle navigation image synthesis method provided in the embodiments of the present disclosure, displacement amount may be subtracted from the fourth coordinates of each sampling point, so that the coordinates of all sampling points are in the same coordinate system (i.e., the reference coordinate system). In this way, it is possible to avoid the confusion of the target image caused by determining the sampling points at the same position as different sampling points for synthesis. As a result, the obtained target image is closer to the real junction image.

Figure 14:
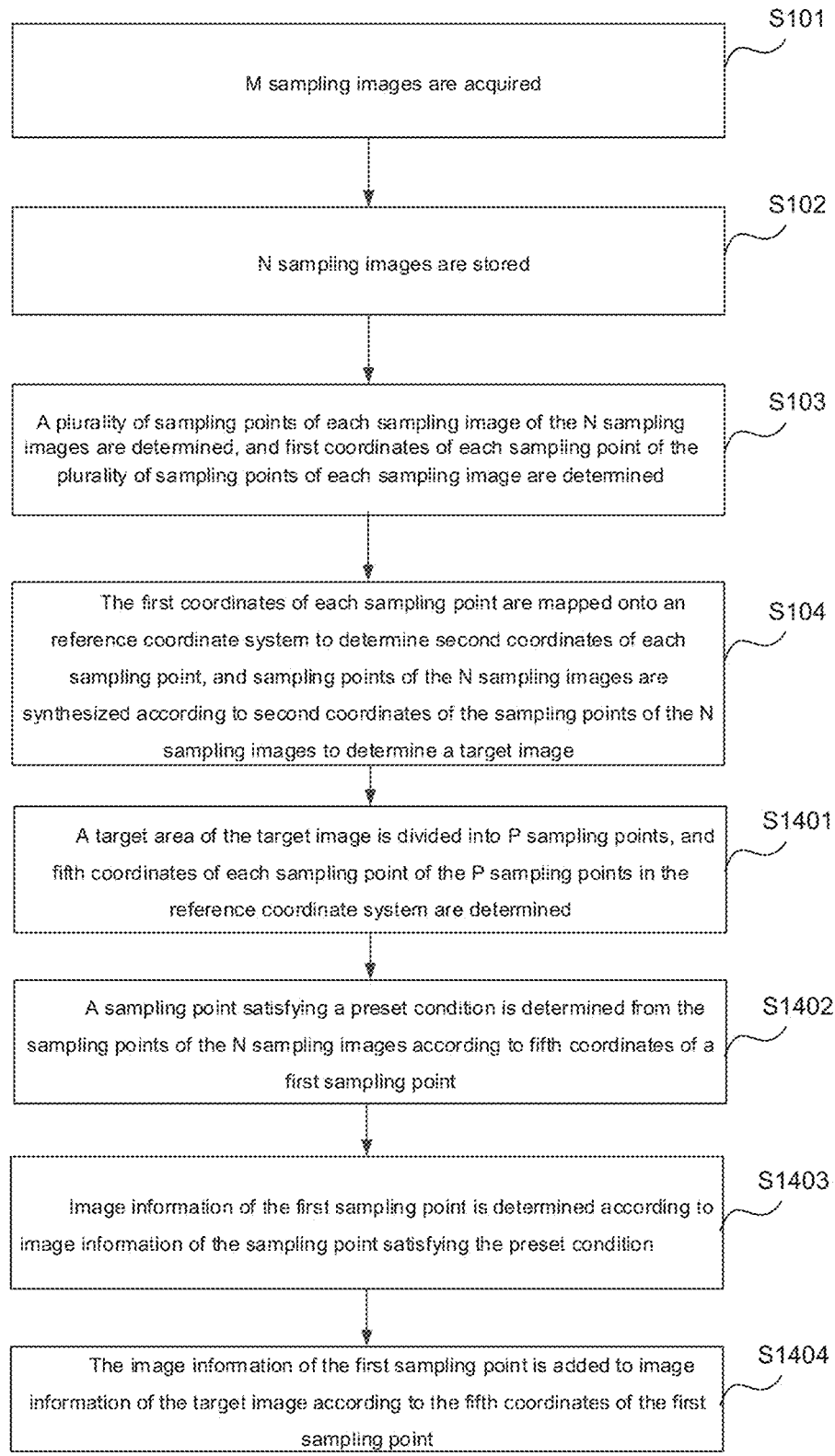
FIG. 14 is a flow diagram of yet another vehicle navigation image synthesis method, in accordance with some embodiments of the present disclosure.

It will be noted that after the target image is obtained through the synthesis process, the vehicle navigation image synthesis device may determine whether the target image has a low-resolution area. If the target image has the low-resolution area, the vehicle navigation image synthesis device may optimize the target image. For example, as shown in FIG. 14, after S104, the vehicle navigation image synthesis method further includes S1401 to S1404.

In S1401, a target area of the target image is divided into P sampling points, and fifth coordinates of each of the P sampling points in the reference coordinate system are determined.

The target area is an area whose pixels per inch (PPI) is lower than a preset PPI threshold P is a positive integer.

In S1402, a sampling point satisfying a preset condition are determined from the sampling points of the N sampling images according to fifth coordinates of a first sampling point.

The first sampling point is any one of the P sampling points.

In S1403, image information of the first sampling point is determined according to image information of the sampling point satisfying the preset condition.

Figure 15:
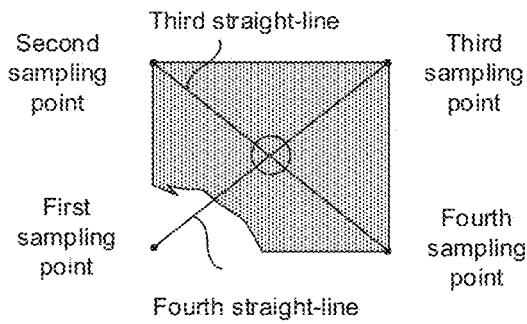
FIG. 15 is a diagram illustrating positions of sampling points satisfying a preset condition, in accordance with some embodiments of the present disclosure.

In some embodiments, as shown in FIG. 15, the sampling points satisfying the preset condition may include a second sampling point, a third sampling point, and a fourth sampling point.

The first sampling point is any one of the P sampling points. The second sampling point and the fourth sampling point are two endpoints of a third straight line. The first sampling point and the third sampling point are two endpoints of a fourth straight line. A length of the third straight line is the same a length of the fourth straight line, and an intersection point of the third straight line and the fourth straight line coincides with both a midpoint of the third straight line and a midpoint of the fourth straight line.

In some other embodiments, the sampling points satisfying the preset condition may include a fifth sampling point, a sixth sampling point, and a seventh sampling point.

A difference between an X-coordinate of the fifth sampling point and an X-coordinate of the sixth sampling point is a first preset difference, and a difference between a Y-coordinate of the fifth sampling point and a Y-coordinate of the sixth sampling point is 0. A difference between an X-coordinate of the first sampling point and an X-coordinate of the seventh sampling point is a second preset difference, and a difference between a Y-coordinate of the first sampling point and a Y-coordinate of the seventh sampling point is 0. The Y-coordinate of the first sampling point is the same as the Y-coordinate of the fifth sampling point. The Y-coordinate of the sixth sampling point is the same as the Y-coordinate of the seventh sampling point.

It will be noted that, the first preset difference and the second preset difference may be set by a computing device 2203 according to actual conditions, which is not limited in the present disclosure.

In S1404, the image information of the first sampling point is added to image information of the target image according to the fifth coordinates of the first sampling point.

The above technical solution brings at least the following beneficial effects. In the vehicle navigation image synthesis method provided in the embodiments of the present disclosure, the fifth coordinates of the sampling point(s) in the target area and the preset condition may be determined, the sampling point(s) satisfying the preset condition are determined, and the image information of the sampling point(s) in the target area is determined according to the image information of the sampling point(s) satisfying the preset condition. The vehicle navigation image synthesis device may add the image information of the first sampling point to the image information of the target image according to the fifth coordinates of the first sampling point, so as to further optimize the target image. As a result, the determined target image is closer to the real junction image.

Figure 16:
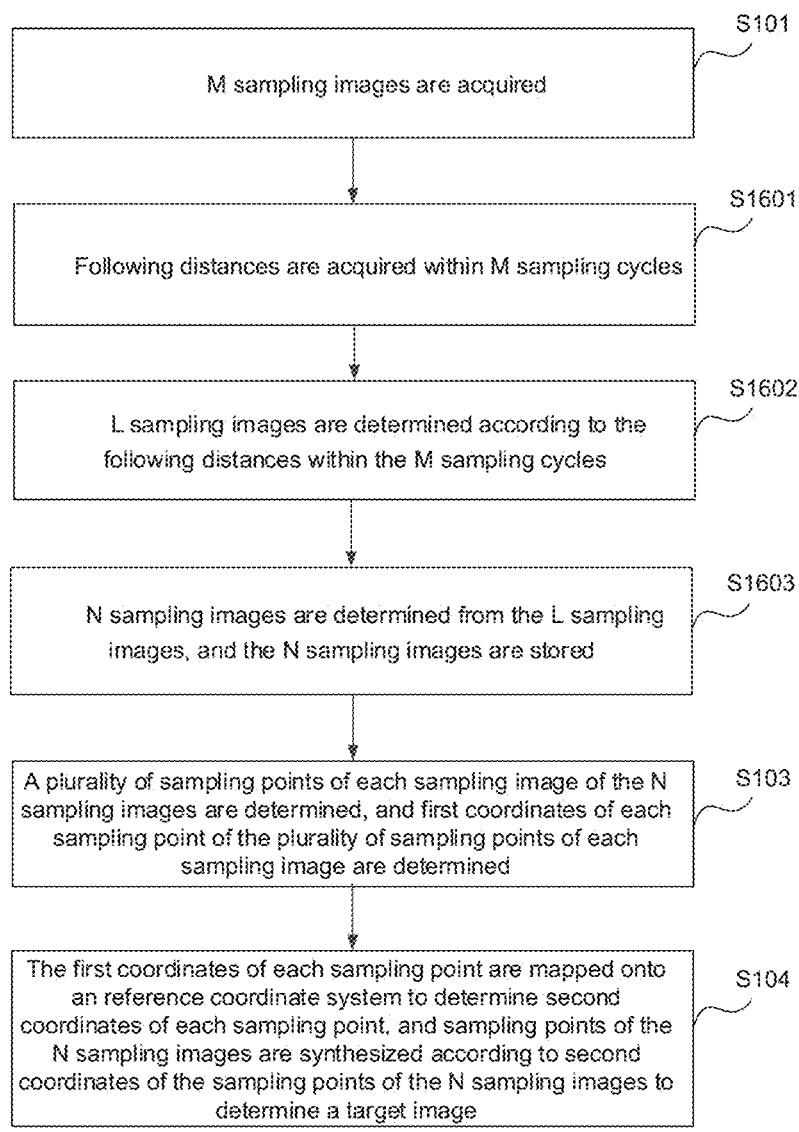
FIG. 16 is a flow diagram of yet another vehicle navigation image synthesis method, in accordance with some embodiments of the present disclosure.

In some embodiments, as shown in FIG. 16, as for details of an implementation of the S102, reference may be made to S1601 to S1603.

In S1601, following distances are acquired within M sampling cycles.

A single sampling cycle corresponds to a single sampling image.

In S1602, L sampling images are determined according to the following distances in M sampling cycles.

L is a positive integer less than or equal to M.

In S1603, the N sampling images are determined from the L sampling images, and the N sampling images are stored.

Positions of the target vehicle corresponding to the N sampling images are different.

Figure 17:
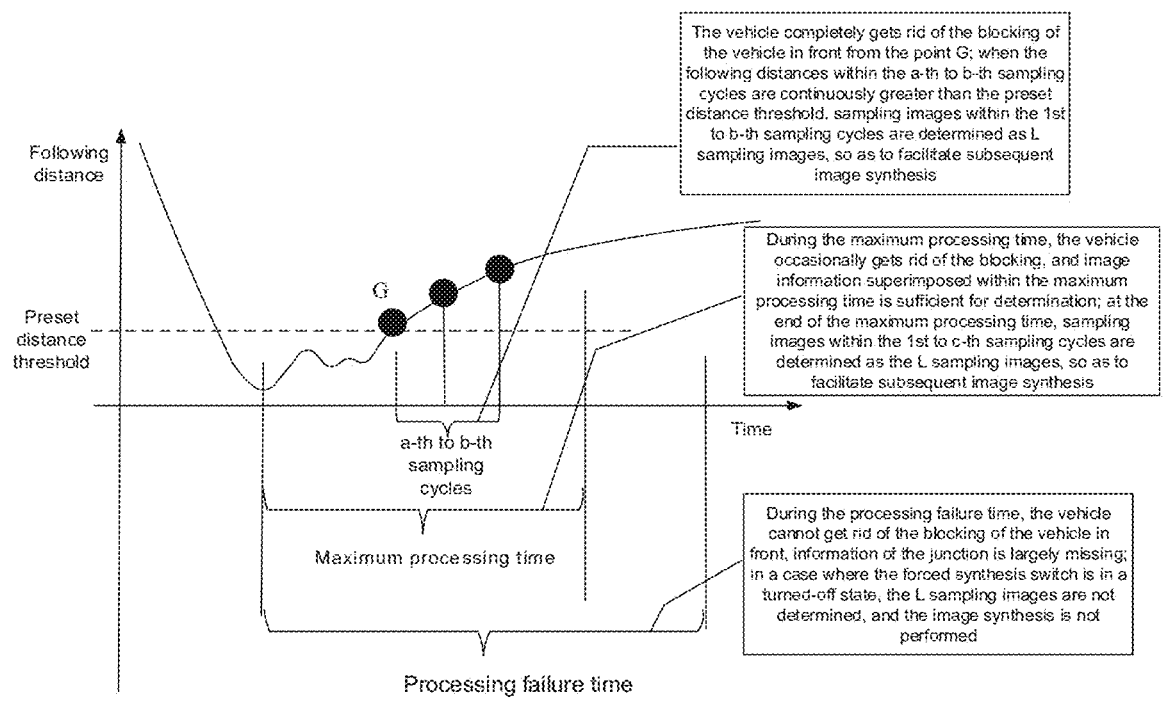
FIG. 17 is a diagram illustrating a principle of a method for determining L sampling images, in accordance with some embodiments of the present disclosure.

As shown in FIG. 17, the L sampling images satisfy the following conditions.

If following distances within an a-th sampling cycle to a b-th sampling cycle are all greater than a preset distance threshold, the L sampling images include sampling images within a 1st sampling cycle to the b-th sampling cycle; a is a positive integer, and b is a positive integer greater than a; and a difference between a and b is greater than or equal to a first preset quantity threshold.

If the number of following distances greater than the preset distance threshold of following distances within the 1st sampling cycle to a c-th sampling cycle is greater than a second preset quantity threshold, the L sampling images include sampling images within the 1st sampling cycle to the c-th sampling cycle; a value of c is determined according to the speed of the target vehicle or the current position of the target vehicle; and c is a positive integer greater than 1.

If a forced synthesis switch is in a turned-on state (i.e., the image synthesis is enforced), the L sampling images include the sampling images within the 1st sampling cycle to the c-th sampling cycle or sampling images within the 1st sampling cycle to a d-th sampling cycle. A value of d is determined according to the speed of the target vehicle or the current position of the target vehicle; and d is a positive integer greater than c.

It will be noted that the following distance refers to a distance between the target vehicle and a vehicle in front. In a case where the following distances are different, sampling ranges of the image acquisition device blocked by the vehicle in front are different.

Figure 18A:
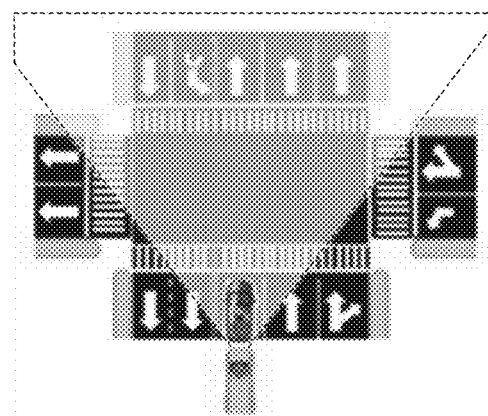
FIG. 18A is a diagram illustrating positions of a target vehicle and a vehicle in front, in accordance with some embodiments of the present disclosure.
Figure 18B:
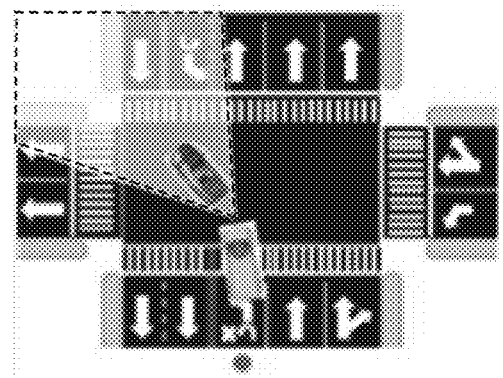
FIG. 18B is a diagram illustrating positions of a target vehicle and a vehicle in front, in accordance with some other embodiments of the present disclosure.
Figure 18C:
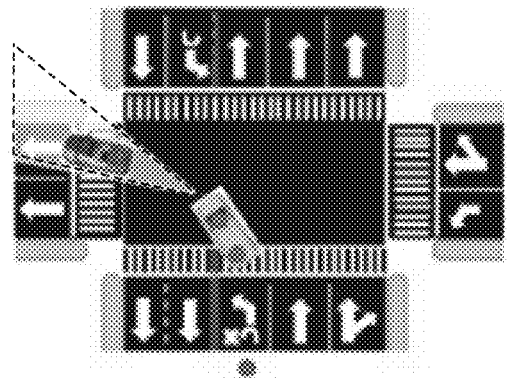
FIG. 18C is a diagram illustrating positions of a target vehicle and a vehicle in front, in accordance with yet some other embodiments of the present disclosure.
Figure 19:
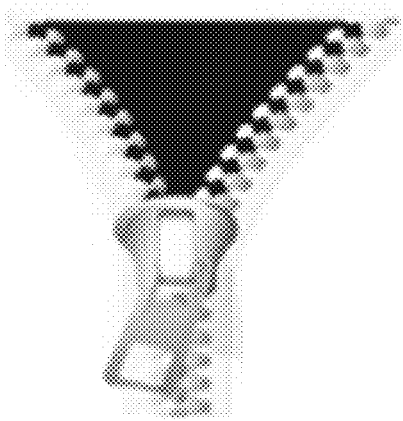
FIG. 19 is a structural diagram of a zipper, in accordance with some embodiments of the present disclosure.

For example, FIG. 18A is a diagram showing positions of the target vehicle and the vehicle in front when the following distance is 5 meters. FIG. 18B is a diagram showing positions of the target vehicle and the vehicle in front when the following distance is 20 meters. FIG. 18C is a diagram showing positions of the target vehicle and the vehicle in front when the following distance is 80 meters. The dotted areas in FIGS. 18A, 18B, and 18C are used to indicate sampling ranges of the image acquisition device 2201 blocked by the vehicle in front. Comparing FIGS. 18A, 18B, and 18C, it can be seen that as the following distance continues to increase, an angle for the image acquisition will continue to change, and a range of the dotted area (i.e., the sampling range of the image acquisition device blocked by the vehicle in front) will continue to reduce. The process of reducing the range of the dotted area is similar to a process of two chains of a zipper (as shown in FIG. 19) being gradually interlocked with each other. The smaller the sampling range of the image acquisition device blocked by the vehicle in front, the more comprehensive the image information of the junction acquired by the image acquisition device.

It will be noted that, the vehicle navigation image synthesis device may acquire a minimum value of a following distance in a case where the sampling range of the image acquisition device of the target vehicle is not blocked by the vehicle in front, and set the preset distance threshold as the minimum value.

For example, the preset distance threshold is 100 meters, and the first preset quantity threshold is 3. In a case where following distances in a 2nd sampling cycle to a 5th sampling cycle are all greater than 100 meters, the L sampling images include sampling images within the 1st sampling cycle to the 5th sampling cycle. In this case, within the 2nd sampling cycle to the 5th sampling cycle, the target vehicle has completely got rid of the blocking of the sampling range of the image acquisition device of the target vehicle by the vehicle in front, and the sampling images acquired by the image acquisition device include the image information of the entire junction.

For example, the preset distance threshold is 100 meters, the second preset quantity threshold is 5, and the value of c is 8; if the number of following distances greater than 100 meters of the following distances within the 1st sampling cycle to an 8th sampling cycle is 6, then the L sampling images include sampling images within the 1st sampling cycle to the 8th sampling cycle. During the 1st sampling cycle to the 8th sampling cycle, the target vehicle can occasionally completely get rid of the blocking of the sampling range of the image acquisition device of the target vehicle by the vehicle in front. In this way, the sampling images within the 1st sampling cycle to the 8th sampling cycle are sufficient for synthesizing to obtain the target image.

In some embodiments, the vehicle navigation image synthesis device may determine a maximum processing time (T_Max) according to the speed of the target vehicle and a diagonal distance of the junction. The vehicle navigation image synthesis device may determine a maximum number of sampling cycles that are included in the maximum processing time, and then determine the value of c according to the maximum number of sampling cycles that are included in the maximum processing time.

The maximum processing time (T_Max) may satisfy the Formula 5:

$$T\_Max = T\_cross/2 \qquad \text{Formula 5}$$

Here, T_cross is time required for the target vehicle to pass through the junction.

The time (T_cross) required for the target vehicle to pass through the junction may satisfy the Formula 6:

$$T\_cross = k1 \times Di/Sp \qquad \text{Formula 6}$$

Here, k1 is a first coefficient; Di is the diagonal distance of the junction; and Sp is the speed of the target vehicle.

It will be noted that the vehicle navigation image synthesis device may further determine the state of the forced synthesis switch to determine whether to perform the synthesis forcibly.

If the number of following distances greater than the preset distance threshold of the following distances within the 1st sampling cycle to the c-th sampling cycle is less than or equal to the second preset number threshold, and the forced synthesis switch is in a turned-on state, then the vehicle navigation image synthesis device determines that the L sampling images include the sampling images within the 1st sampling cycle to the c-th sampling cycle, so as to facilitate the subsequent forced synthesis of the sampling images within the 1st sampling cycle to the c-th sampling cycle.

If the current moment is a processing failure time, and the forced synthesis switch is in a turned-on state, then the vehicle navigation image synthesis device determines that the L sampling images include the sampling images within the 1st sampling cycle to the d-th sampling cycle, so as to facilitate the subsequent forced synthesis of the sampling images within the 1st sampling cycle to the d-th sampling cycle. In this case, the vehicle navigation image synthesis device may determine the processing failure time (T_Fail) according to the speed of the target vehicle and the diagonal distance of the junction. The vehicle navigation image synthesis device may determine a maximum number of sampling cycles included in the processing failure time, and then determine the value of d according to the maximum number of sampling cycles included in the processing failure time.

The processing failure time (T_Fail) satisfies the Formula 7:

$$T\_Fail = k2 \times T\_cross \qquad \text{Formula 7}$$

Here, k2 is a second coefficient.

It will be noted that k2 may be set by the vehicle navigation image synthesis device according to actual situations. For example, the vehicle navigation image synthesis device sets k2 to 1, which is not limited in the present disclosure.

It will be pointed out that if the forced synthesis switch is in a turned-off state, the vehicle navigation image synthesis device does not determine the L sampling images and does not synthesize images. When the target vehicle has passed the junction, the vehicle navigation image synthesis device may set the forced synthesis switch to be in a turned-off state.

In some other embodiments, the vehicle navigation image synthesis device may further determine the value of c and the value of d according to the current position of the target vehicle. In this case, when the target vehicle is in a first target range, the vehicle navigation image synthesis device may determine that a sampling cycle in which a current moment is located is the c-th sampling cycle; and when the target vehicle is in a second target range, the vehicle navigation image synthesis device may determine that the sampling cycle in which the current moment is located the d-th sampling cycle. For example, the first target range may be a range near a center of the junction, and the second target range may be a range in which the vehicle is about to pass through the junction (a range near an edge of the junction).

It will be noted that, in a case where there is no navigation map data, the vehicle navigation image synthesis device cannot determine whether the current position of the target vehicle is located at the center of the junction or at the edge of the junction through a global positioning system (GPS), and can only determine the value of c and the value of d through the maximum processing time and the processing failure time.

The above technical solution brings at least the following beneficial effects. In the vehicle navigation image synthesis method provided in the embodiments of the present disclosure, redundant sampling images may be removed from the sampling images within the M sampling cycles, and the final N sampling images that need to be synthesized may be determined according to the following distances. Therefore, it is possible to prevent the redundant sampling images from being involved in the synthesis process of the target image, and the synthesis efficiency of the target image is improved.

Figure 20:
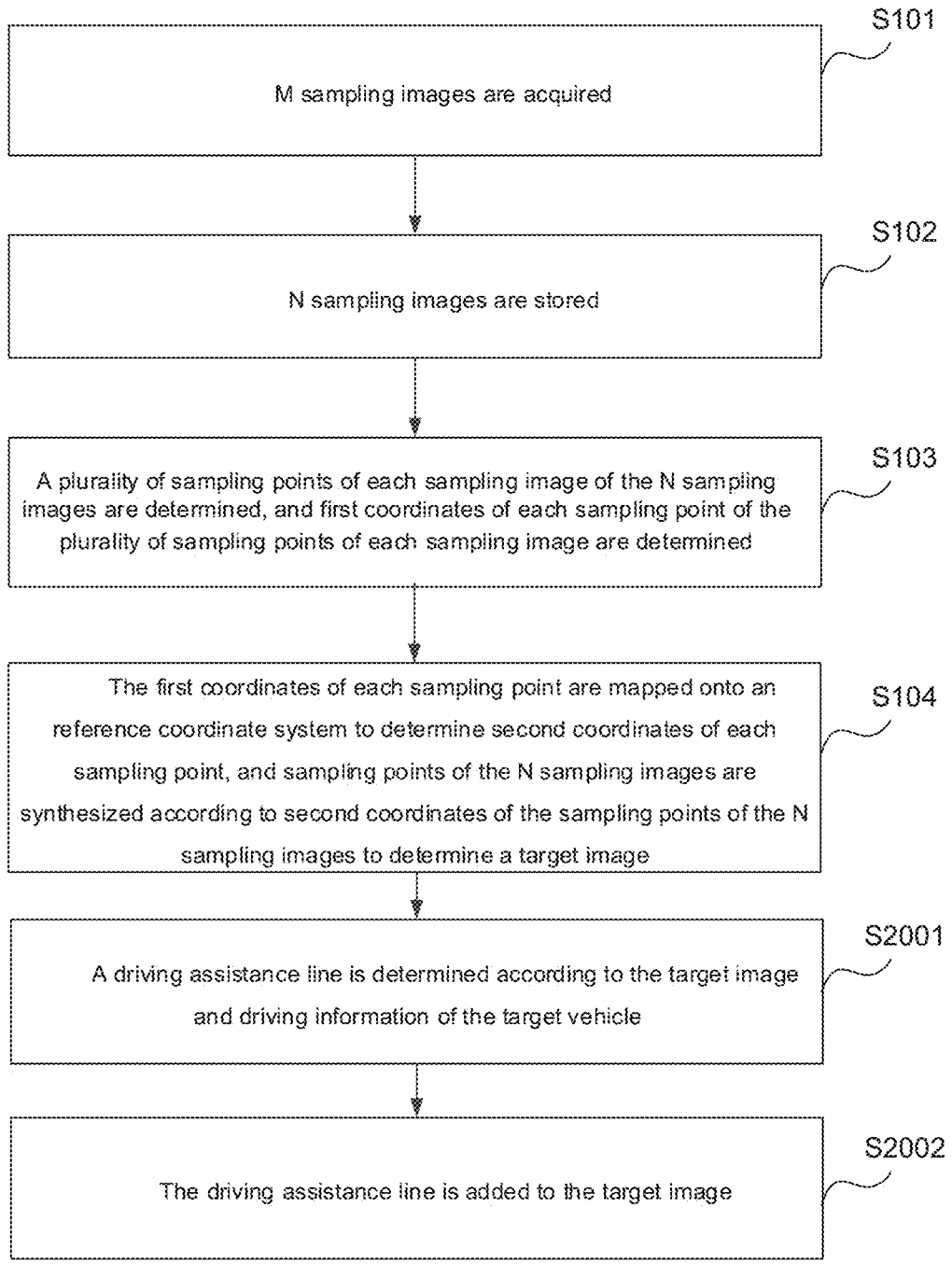
FIG. 20 is a flow diagram of yet another vehicle navigation image synthesis method, in accordance with some embodiments of the present disclosure.

It will be noted that after the vehicle navigation image synthesis device determines the target image, the vehicle navigation image synthesis device may further add driving assistance line(s) to the target image, so as to reduce the driving difficulty of the driver, and improve the driving experience of the driver. For example, as shown in FIG. 20, after S104, the vehicle navigation image synthesis method further includes S2001 to S2002.

In S2001, the driving assistance line(s) are determined according to the target image and driving information of the target vehicle.

It will be noted that the driving assistance line(s) may include at least one of: a driving border line and a driving center line.

In some embodiments, the vehicle navigation image synthesis device may determine the driving assistance line(s) according to driving regulation line(s) in the target image and the driving direction of the target vehicle.

For example, the driving information of the target vehicle includes the driving direction of the target vehicle, the speed of the target vehicle, and the position of the target vehicle.

In S2002, the driving assistance line(s) are added to the target image.

Figure 21A:
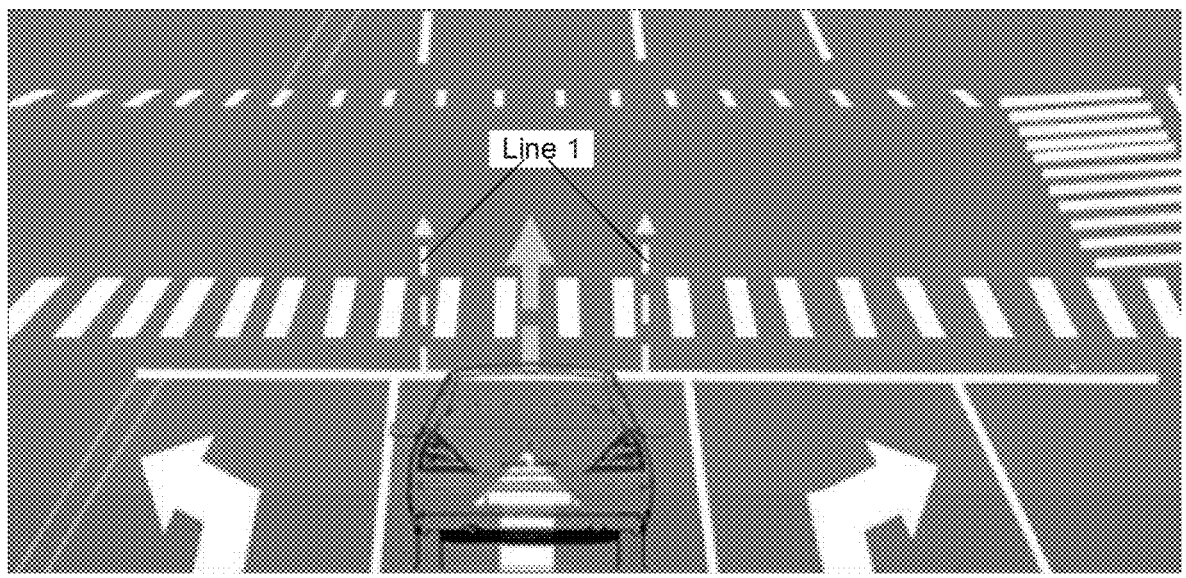
FIG. 21A is a schematic diagram illustrating driving assistance lines, in accordance with some embodiments of the present disclosure.
Figure 21B:
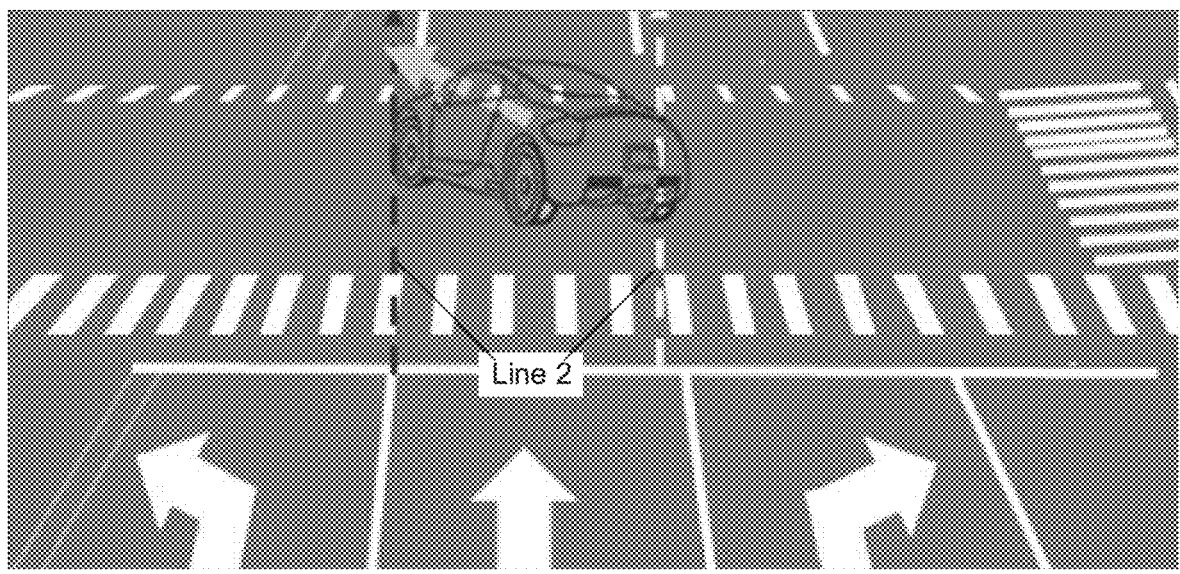
FIG. 21B is a schematic diagram illustrating driving assistance lines, in accordance with some other embodiments of the present disclosure.

For example, lines marked by Line 1 shown in FIG. 21A are driving assistance lines when the target vehicle drives normally in the straight-line driving direction; and lines marked by Line 2 shown in FIG. 21B are driving assistance lines when the target vehicle drives abnormally in the straight-line driving direction.

For example, the vehicle navigation image synthesis device may further detect the position of the target vehicle. When the vehicle navigation image synthesis device detects that a distance between the position of the target vehicle and the driving assistance line is less than or equal to a border threshold value (the target vehicle runs on or is about to run on the driving assistance line), the vehicle navigation image synthesis device may further provide warning information for the driver. The warning information may include at least one of: an alarm sound, displaying the driving assistance line in black, or highlighting and flashing the driving assistance line and then displaying it. For example, comparing FIG. 21A and FIG. 21B, it can be seen that when the target vehicle runs on a driving assistance line, the driving assistance line is marked black.

The above technical solution brings at least the following beneficial effects: in the vehicle navigation image synthesis method provided in the embodiments of the present disclosure, after the target image is obtained through the synthesis, the driving assistance line(s) may be added to the target image. Therefore, it may be possible to provide driving assistance for the driver according to the driving assistance line(s) and the position of the target vehicle. As a result, the difficulty for the driver to drive the vehicle is reduced, and the driving experience of the driver is improved.

Figure 22:
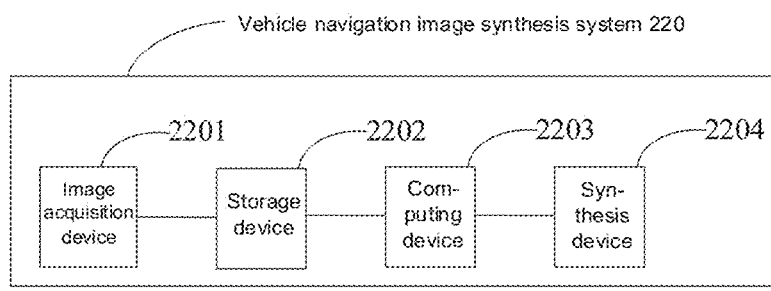
FIG. 22 is a structural diagram of a vehicle navigation image synthesis system, in accordance with some embodiments of the present disclosure.

In order to realize the vehicle navigation image synthesis method provided in the embodiments of the present disclosure, the embodiments of the present disclosure further provide a vehicle navigation image synthesis system, which is used to perform the vehicle navigation image synthesis method provided in the embodiments of the present disclosure. FIG. 22 is a diagram showing a structure of the vehicle navigation image synthesis system provided in the embodiments of the present disclosure. The vehicle navigation image synthesis system 220 includes: an image acquisition device 2201, a storage device 2202, a computing device 2203, and a synthesis device 2204.

The image acquisition device 2201 is configured to acquire M sampling images. The M sampling images include a preset sampling image for establishing a reference coordinate system. M is a positive integer.

The storage device 2202 is configured to store N sampling images. N is a positive integer less than or equal to M. A value of N is determined according to a speed of the target vehicle, a position of the target vehicle, and a following distance of the target vehicle.

The computing device 2203 is configured to determine a plurality of sampling points of each sampling image of the N sampling images, and determine first coordinates of each sampling point of the plurality of sampling points of each sampling image. The first coordinates include a first Y-coordinate and a first X-coordinate. The first Y-coordinate is determined according to parameters of the image acquisition device and a position of each sampling point of a sampling image where the sampling point is located. The first X-coordinate is determined according to projections, on an intermediate coordinate system, of border lines of the sampling image where the sampling point is located. The intermediate coordinate system is a coordinate system established according to a current position of the target vehicle and a current driving direction of the target vehicle.

The synthesis device 2204 is configured to map the first coordinates of each sampling point to the reference coordinate system to determine second coordinates of each sampling point, and synthesize sampling points of the N sampling images according to second coordinates of the sampling points of the N sampling images to determine a target image.

It will be noted that, as for the manner in which each device in the vehicle navigation image synthesis system 220 performs the above operations, reference may be made to the corresponding content in S101 to S104 in the foregoing embodiments, and details will not be repeated here.

The above technical solution brings at least the following beneficial effects. In the vehicle navigation image synthesis system 220 provided in the embodiments of the present disclosure, the computing device 2203 may obtain the first coordinates of the plurality of sampling points of each sampling image in a corresponding real-world coordinate system (i.e., the intermediate coordinate system) according to positions of the plurality of sampling points of each sampling image of the N sampling images, and the synthesis device 2204 maps the first coordinates of the plurality of sampling points of each sampling image are mapped to the reference coordinate system to determine the second coordinates of each sampling point, so that the sampling points of a plurality of sampling images may be transformed into the same coordinate system (i.e., the reference coordinate system). The plurality of sampling images in the same coordinate system may be directly superimposed to obtain an image of the entire junction (i.e., the target image). It can be seen from the above that the vehicle navigation image synthesis system 220 provided in the embodiments of the present disclosure may synthesize N incomplete images (i.e., images blocked by a vehicle in front) into a complete image, so as to determine the image of the entire junction according to the complete image. Therefore, even if there is no navigation map data or the vehicle-mounted camera cannot acquire the image information of the entire junction at once, the vehicle navigation image synthesis system 220 may also determine the image information of the entire junction. As a result, the vehicle-mounted system may provide the user with reliable driving assistance based on the image information of the entire junction, which may improve the driving safety of the vehicle and reduce the difficulty of driving the vehicle by the driver.

In some embodiments, the computing device 2203 is configured to: determine a target sampling point and a target sampling image where the target sampling point is located; establish an image coordinate system of the target sampling image; determine third coordinates of the target sampling point in the image coordinate system; and determine a first Y-coordinate of the target sampling point according to the parameters of the image acquisition device 2201 and a third Y-coordinate.

The target sampling point is any one of the plurality of sampling points of the target sampling image. The target sampling image is any one of the N sampling images.

An origin of the image coordinate system is a central point of the target sampling image. An X-axis of the image coordinate system is perpendicular to a left border line or a right border line of the sampling image. A Y-axis of the image coordinate system is perpendicular to an upper border line or a lower border line of the sampling image. The third coordinates of the target sampling point in the image coordinate system include: the third Y-coordinate and a third X-coordinate. The third X-coordinate is an X-coordinate of the target sampling point of the image coordinate system. The third Y-coordinate is a Y-coordinate of the target sampling point of the image coordinate system.

The parameters of the image acquisition device 2201 include: a vertical distance between the image acquisition device 2201 and the ground, a sampling angle of the image acquisition device 2201, and a focal length of the image acquisition device 2201. The sampling angle of the image acquisition device 2201 is an included angle between an acquisition direction of the image acquisition device 2201 and a direction perpendicular to the ground.

It will be noted that, as for the manner in which the device in the vehicle navigation image synthesis system 220 performs the above operations, reference may be made to the corresponding content in S301 to S303 in the foregoing embodiments, and details will not be repeated here.

The above technical solution brings at least the following beneficial effects. In the vehicle navigation image synthesis system 220 provided in the embodiments of the present disclosure, the computing device 2203 may determine the image coordinate system on the sampling image, determine the third coordinates of the target sampling point in the image coordinate system, and determine a Y-coordinate of the target sampling point of the intermediate coordinate system (i.e., a first Y-coordinate) according to the third coordinates of the target sampling point and the parameters of the image acquisition device. As a result, the third coordinates of the sampling point of the sampling image may be transformed into the first coordinates of the sampling point of the real junction image, which is convenient to add the image information of the sampling image to the image information of the real junction according to the coordinates of the sampling point of the real junction image.

In some embodiments, the computing device 2203 is configured to: establish an intermediate coordinate system corresponding to the target sampling image; determine a slope of a first straight line, a slope of a second straight line, and a target quantity; and determine a first X-coordinate of the target sampling point according to the slope of the first straight line, the slope of the second straight line, the target quantity, the first Y-coordinate of the target sampling point, and the third X-coordinate.

An origin of the intermediate coordinate system corresponding to the target sampling image is a current position of the target vehicle corresponding to the target sampling image. A positive direction of a Y-axis of the intermediate coordinate system corresponding to the target sampling image is a current driving direction of the target vehicle corresponding to the target sampling image. An X-axis of the intermediate coordinate system corresponding to the target sampling image is parallel to the ground.

The first straight line is a straight line obtained by projecting the left border line of the target sampling image on the intermediate coordinate system corresponding to the target sampling image. The second straight line is a straight line obtained by projecting the right border line of the target sampling image on the intermediate coordinate system corresponding to the target sampling image. The target quantity is half of the number of sampling points of the target sampling image on the X-axis of the image coordinate system.

It will be noted that, as for the manner in which the device in the vehicle navigation image synthesis system 220 performs the above operations, reference may be made to the corresponding content in S601 to S603 in the foregoing embodiments, and details will not be repeated here.

The above technical solution brings at least the following beneficial effects. In the vehicle navigation image synthesis system 220 provided in the embodiments of the present disclosure, the computing device 2203 may determine slopes of projections of sampling border lines of the image acquisition device 2201 on the intermediate coordinate system (i.e. the slope of the first straight line and the slope of the second straight line) and half of the number of sampling points on the X axis of the image coordinate system (i.e., the target quantity), and may determine the first X coordinate according to the slope of the first straight line, the slope of the second straight line, the target quantity, the first Y-coordinate, and the third X-coordinate. As a result, the third coordinates of the sampling point in the sampling image may be transformed into first coordinates of a sampling point of the real junction image, which is convenient to add image information of the sampling image to the image information of the real junction image according to the coordinates of sampling points of the real junction image.

In some embodiments, the synthesis device 2204 is configured to: map the first coordinates of each sampling point to an angle-restoration coordinate system to determine fourth coordinates of each sampling point; map the fourth coordinates of each sampling point to the reference coordinate system to determine the second coordinates of each sampling point; and synthesize the plurality of sampling points according to the second coordinates of each sampling point to determine the target image.

The angle-restoration coordinate system is a coordinate system obtained by rotating the intermediate coordinate system by a preset angle.

It will be noted that, as for the manner in which the device in the vehicle navigation image synthesis system 220 performs the above operations, reference may be made to the corresponding content in S801 to S802 in the foregoing embodiments, and details will not be repeated here.

The above technical solution brings at least the following beneficial effects. In the vehicle navigation image synthesis system 220 provided in the embodiments of the present disclosure, the synthesis device 2204 may restore the coordinates of each sampling point to coordinates in the corresponding intermediate coordinate system to determine the fourth coordinates of each sampling point, and then map the fourth coordinates of each sampling point onto the reference coordinate system to determine the second coordinates of each sampling point. Since the obtained second coordinates of all sampling points of the N sampling images are located in a same coordinate system, the synthesis device 2204 may synthesize all sampling points of the N sampling images according to the second coordinates of all sampling points of the N sampling images to determine the target image. In this way, the determined target image is not confused, and is closer to the real junction image.

Figure 23:
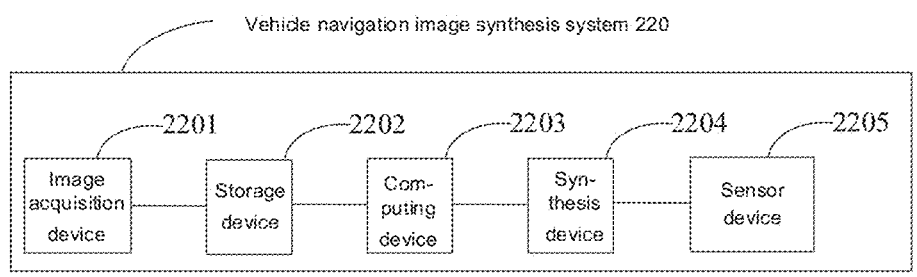
FIG. 23 is a structural diagram of another vehicle navigation image synthesis system, in accordance with some embodiments of the present disclosure.

In some embodiments, as shown in FIG. 23, the vehicle navigation image synthesis system 220 further includes a sensor device 2205.

The sensor device 2205 is configured to acquire a deviation angle of the target vehicle. The deviation angle of the target vehicle is an included angle between the current driving direction of the target vehicle and a straight-line driving direction of the target vehicle.

The synthesis device 2204 is configured to: determine a preset angle of the target sampling image; rotate the target sampling image and the intermediate coordinate system corresponding to the target sampling image clockwise by the preset angle of the target sampling image to determine an angle-restored target sampling image and an angle-restoration coordinate system corresponding to the target sampling image; and determine coordinates of the target sampling point of the angle-restored target sampling image in the angle-restoration coordinate system corresponding to the target sampling image as fourth coordinates of the target sampling point.

The preset angle of the target sampling image is determined according to the deviation angle of the target vehicle within the sampling cycle of the target sampling image.

It will be noted that, as for the manner in which the device in the vehicle navigation image synthesis system 220 performs the above operations, reference may be made to the corresponding content in S1001 to S1004 in the foregoing embodiments, and details will not be repeated here.

The above technical solution brings at least the following beneficial effects. In the vehicle navigation image synthesis system 220 provided in the embodiments of the present disclosure, the synthesis device 2204 may rotate the target sampling image and the intermediate coordinate system clockwise by the preset angle, and may determine the coordinates of the angle-restored target sampling point of the target sampling image in the angle-restoration coordinate system as the fourth coordinates of the target sampling point. In this way, it is possible to avoid the confusion of the target image caused by synthesizing the sampling images from different angles. As a result, the obtained target image is closer to the real junction image.

In some embodiments, the synthesis device 2204 is configured to: establish a reference coordinate system; determine a first distance difference and a second distance difference; and determine a second X-coordinate and a second Y-coordinate.

An origin of the reference coordinate system is the position of the target vehicle within the sampling cycle of the preset sampling image. A positive direction of a Y-axis of the reference coordinate system is the driving direction of the target vehicle within the sampling cycle of the preset sampling image. An X-axis of the reference coordinate system is parallel to the ground.

The first distance difference is a distance difference between the origin of the angle-restoration coordinate system and the origin of the reference coordinate system in a direction of the X-axis of the angle-restoration coordinate system. The second distance difference is a distance difference between the origin of the angle-restoration coordinate system and the origin of the reference coordinate system in a direction of the Y-axis of the angle-restoration coordinate system.

The second X-coordinate is a difference between the fourth X-coordinate of the fourth coordinates and the first distance difference. The second Y-coordinate is a difference between the fourth Y-coordinate of the fourth coordinates and the second distance difference.

It will be noted that, as for the manner in which the device in the vehicle navigation image synthesis system 220 performs the above operations, reference may be made to the corresponding content in S1201 to S1203 in the foregoing embodiments, and details will not be repeated here.

The above technical solution brings at least the following beneficial effects. In the vehicle navigation image synthesis system 220 provided in the embodiments of the present disclosure, displacement amount may be subtracted from the fourth coordinates of each sampling point through the synthesis device 2204, so that the coordinates of all sampling points are in the same coordinate system (i.e., the reference coordinate system). In this way, it is possible to avoid the confusion of the target image caused by determining the sampling points at the same position as different sampling points for synthesis. As a result, the obtained target image is closer to the real junction image.

In some embodiments, the computing device 2203 is further configured to: divide a target area of the target image into P sampling points; determine fifth coordinates of each of the P sampling points in the reference coordinate system; determine a sampling point satisfying a preset condition from the sampling points of the N sampling images according to fifth coordinates of a first sampling point; and determine image information of the first sampling point according to image information of the sampling point satisfying the preset condition.

The target area is an area whose PPI is lower than a preset PPI threshold. P is a positive integer.

The synthesis device 2204 is further configured to add the image information of the first sampling point to the target image according to image information of the fifth coordinates of the first sampling point.

It will be noted that, as for the manner in which each device in the vehicle navigation image synthesis system 220 performs the above operations, reference may be made to the corresponding content in S1401 to S1404 in the foregoing embodiments, and details will not be repeated here.

The above technical solution brings at least the following beneficial effects. In the vehicle navigation image synthesis system provided in the embodiments of the present disclosure, the computing device 2203 may determine the fifth coordinates of the sampling point(s) in the target area and the preset condition, determine the sampling point(s) satisfying the preset condition, and then determine the image information of the sampling point(s) in the target area according to the image information of the sampling point(s) satisfying the preset condition. The synthesis device 2204 adds the image information of the first sampling point to the image information of the target image according to the fifth coordinates of the first sampling point. In this way, the target image may be further optimized, and the determined target image is closer to the real junction image.

In some embodiments, the image acquisition device 2201 is further configured to acquire following distances within M sampling cycles. A single sampling cycle corresponds to a single sampling image.

The storage device 2202 is configured to: determine L sampling images according to the following distances in the M sampling cycles; determine the N sampling images from L sampling images; and store the N sampling images.

L is a positive integer less than or equal to M. Positions of the target vehicle corresponding to the N sampling images are different.

The L sampling images satisfy the following conditions.

If following distances within an a-th sampling cycle to a b-th sampling cycle are all greater than a preset distance threshold, the L sampling images include sampling images within a 1st sampling cycle to the b-th sampling cycle; a is a positive integer, and b is a positive integer greater than a; and a difference between a and b is greater than or equal to a first preset quantity threshold.

If the number of following distances greater than the preset distance threshold of following distances within the 1st sampling cycle to a c-th sampling cycle is greater than a second preset quantity threshold, the L sampling images include sampling images within the 1st sampling cycle to the c-th sampling cycle; a value of c is determined according to the speed of the target vehicle or the current position of the target vehicle [and c is a positive integer greater than 1.

If a forced synthesis switch is in a turned-on state (i.e., the image synthesis method is enforced), the L sampling images include the sampling images within the 1st sampling cycle to the c-th sampling cycle, or sampling images within the 1st sampling cycle to a d-th sampling cycle; a value of d is determined according to the speed of the target vehicle or the current position of the target vehicle and d is a positive integer greater than c.

It will be noted that, as for the manner in which the device in the vehicle navigation image synthesis system 220 performs the above operations, reference may be made to the corresponding content in S1601 to S1603 in the foregoing embodiments, and details will not be repeated here.

The above technical solution brings at least the following beneficial effects. In the vehicle navigation image synthesis system 220 provided in the embodiments of the present disclosure, the storage device 2202 may remove redundant sampling images from the sampling images within the M sampling cycles, and may determine the final N sampling images that need to be synthesized according to the following distances. As a result, it is possible to prevent the redundant sampling images from being involved in the synthesis process of the target image, and the synthesis efficiency of the target image is improved.

Figure 24:
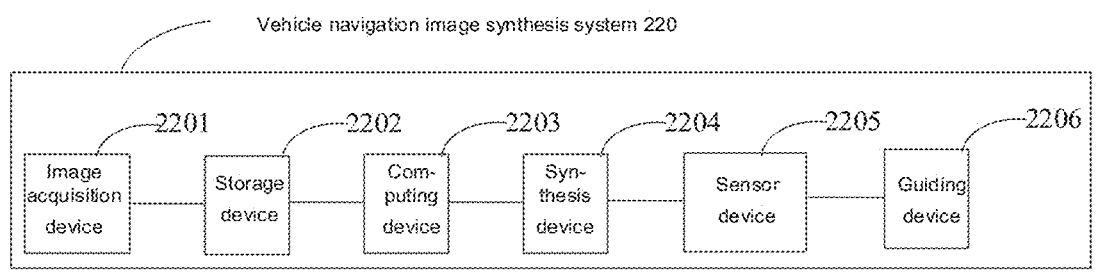
FIG. 24 is a structural diagram of yet another vehicle navigation image synthesis system, in accordance with some embodiments of the present disclosure.

In some embodiments, as shown in FIG. 24, the vehicle navigation image synthesis system 220 further includes a guiding device 2206.

The guiding device 2206 is configured to: determine driving assistance line(s) according to the target image and driving information of the target vehicle; and add the driving assistance line(s) to the target image.

It will be noted that, as for the manner in which the device in the vehicle navigation image synthesis system 220 performs the above operations, reference may be made to the corresponding content in S2001 to S2002 in the foregoing embodiments, and details will not be repeated here.

The above technical solution brings at least the following beneficial effects. In the vehicle navigation image synthesis system 220 provided in the embodiments of the present disclosure, after the target image is obtained through the synthesis, the driving assistance line(s) may be added to the target image. Therefore, it may be possible to provide driving assistance for the driver according to the driving assistance line(s) and the position of the target vehicle. As a result, the difficulty for the driver to drive the vehicle is reduced, and the driving experience of the driver is improved It can be understood that the above vehicle navigation image synthesis method may be implemented by a vehicle navigation image synthesis device. In order to realize the above functions, the vehicle navigation image synthesis device includes a hardware structure and/or a software module corresponding to each function. Those skilled in the art can appreciate that, in combination with the modules and algorithm steps of each example described in the embodiments disclosed herein, the embodiments of the present disclosure can be implemented in hardware or a combination of hardware and computer software. Whether a certain function is executed by hardware or computer software driving hardware depends on the specific application and design constraints of the technical solution. Those skilled in the art may use different methods to implement the described functions for each specific application, but such implementation should not be regarded as exceeding the scope of the embodiments of the present disclosure.

The vehicle navigation image synthesis device in the embodiments of the present disclosure may be divided into functional modules according to the method in the above examples/embodiments. For example, each functional module may be divided corresponding to each function, or two or more functions may be integrated into one processing module. The modules may be implemented in the form of hardware or in the form of software function modules. It will be noted that the division of modules in the embodiments of the present disclosure is exemplary, and is only a logical function division, and there may be other division methods in actual implementation.

Figure 25:
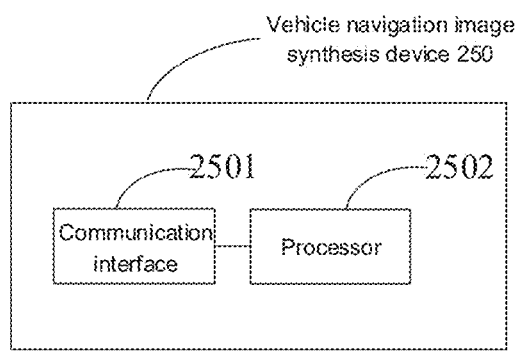
FIG. 25 is a structural diagram of a vehicle navigation image synthesis device, in accordance with some embodiments of the present disclosure.

FIG. 25 is a structural diagram of a vehicle navigation image synthesis device provided in some embodiments of the present disclosure. As shown in FIG. 25, the vehicle navigation image synthesis device 250 may be used to implement the vehicle navigation image synthesis method as described in the foregoing embodiments. The vehicle navigation image synthesis device 250 includes a communication interface 2501 and a processor 2502.

The processor 2502 is coupled to the communication interface 2501. The processor 2502 is configured to run a computer program or instructions, so as to implement the following steps. M sampling images are acquired, the M sampling images include a preset sampling image for establishing a reference coordinate system, and M is a positive integer; N sampling images are stored, N is a positive integer less than or equal to M, and a value of N is determined according to a speed of a target vehicle, a position of the target vehicle, and a following distance of the target vehicle; a plurality of sampling points of each sampling image of the N sampling images are determined, and first coordinates of each sampling point of the plurality of sampling points of each sampling image are determined, the first coordinates include a first Y-coordinate and a first X-coordinate, the first Y-coordinate is determined according to parameters of an image acquisition device and a position of each sampling point in a sampling image where each sampling point is located, the first X-coordinate is determined according to projections of border lines of the sampling image where each sampling point is located on an intermediate coordinate system, and the intermediate coordinate system is a coordinate system established according to a current position of the target vehicle and a current driving direction of the target vehicle; the first coordinates of each sampling point are mapped onto the reference coordinate system to determine second coordinates of each sampling point; and sampling points of the N sampling images are synthesized according to second coordinates of the sampling points of the N sampling images to determine a target image.

In some embodiments, the processor 2502 is configured to implement the following steps. A target sampling point and a target sampling image where the target sampling point is located are determined, the target sampling point is any one of a plurality of sampling points of the target sampling image, and the target sampling image is any one of the N sampling images; an image coordinate system of the target sampling image is established, an origin of the image coordinate system is a center point of the target sampling image, an X-axis of the image coordinate system is perpendicular to a left border line of the target sampling image or a right border line of the target sampling image, a Y-axis of the image coordinate system is perpendicular to an upper border line of the target sampling image or a lower border line of the target sampling image; third coordinates of the target sampling point in the image coordinate system are determined, the third coordinates of the target sampling point in the image coordinate system include a third Y-coordinate and a third X-coordinate, the third X-coordinate is an X-coordinate of the target sampling point of the image coordinate system, and the third Y-coordinate is a Y-coordinate of the target sampling point of the image coordinate system; and a first Y-coordinate of the target sampling point is determined according to the parameters of the image acquisition device and the third Y-coordinate, the parameters of the image acquisition device include a vertical distance between the image acquisition device and a ground, a sampling angle of the image acquisition device, and a focal length of the image acquisition device, and the sampling angle of the image acquisition device is an included angle between an acquisition direction of the image acquisition device and a direction perpendicular to the ground.

In some embodiments, the processor 2502 is configured to implement the following steps. An intermediate coordinate system corresponding to the target sampling image is established, an origin of the intermediate coordinate system corresponding to the target sampling image is a current position of the target vehicle corresponding to the target sampling image, a positive direction of a Y-axis of the intermediate coordinate system corresponding to the target sampling image is a current driving direction of the target vehicle corresponding to the target sampling image, and an X-axis of the intermediate coordinate system corresponding to the target sampling image is parallel to the ground; a slope of a first straight line, a slope of a second straight line, and a target quantity are determined, the first straight line is a straight line obtained by projecting the left border line of the target sampling image on the intermediate coordinate system corresponding to the target sampling image, the second straight line is a straight line obtained by projecting the right border line of the target sampling image on the intermediate coordinate system corresponding to the target sampling image, and the target quantity is a half of a number of sampling points of the target sampling image on the X-axis of the image coordinate system corresponding to the target sampling image; and a first X-coordinate of the target sampling point is determined according to the slope of the first straight line, the slope of the second straight line, the target quantity, the first Y-coordinate of the target sampling point, and the third X-coordinate.

In some embodiments, the processor 2502 is configured to implement the following steps. The first coordinates of each sampling point are mapped to an angle-restoration coordinate system to determine fourth coordinates of each sampling point, and the angle-restoration coordinate system is a coordinate system obtained by rotating the intermediate coordinate system by a preset angle; the fourth coordinates of each sampling point are mapped to the reference coordinate system to determine the second coordinates of each sampling point; and the sampling points of the N sampling images are synthesized according to the second coordinates of the sampling points of the N sampling images to determine the target image.

In some embodiments, the processor 2502 is configured to implement the following steps. A deviation angle of the target vehicle is acquired, and the deviation angle of the target vehicle is an angle between the current driving direction of the target vehicle and a straight-line driving direction of the target vehicle; a preset angle of the target sampling image is determined, and the preset angle of the target sampling image is determined according to a deviation angle of the target vehicle within a sampling cycle of the target sampling image; the target sampling image and the intermediate coordinate system corresponding to the target sampling image are rotated clockwise by the preset angle of the target sampling image to determine an angle-restored target sampling image after angle-restoration and an angle-restoration coordinate system corresponding to the target sampling image; and coordinates of the target sampling point of the target sampling image after the angle-restoration in the angle-restoration coordinate system corresponding to the target sampling image are determined as fourth coordinates of the target sampling point.

In some embodiments, the processor 2502 is configured to implement the following steps. The reference coordinate system is established, an origin of the reference coordinate system is a position of the target vehicle within a sampling cycle of the preset sampling image, a positive direction of a Y-axis of the reference coordinate system is a driving direction of the target vehicle within the sampling cycle of the preset sampling image, and an X-axis of the reference coordinate system is parallel to the ground; a first distance difference and a second distance difference are determined, the first distance difference is a distance difference between an origin of the angle-restoration coordinate system and the origin of the reference coordinate system in a direction of an X-axis of the angle-restoration coordinate system, and the second distance difference is a distance difference between the origin of the angle-restoration coordinate system and the origin of the reference coordinate system in a direction of an Y-axis of the angle-restoration coordinate system; and a second X-coordinate and a second Y-coordinate included in the second coordinates are determined, the second X-coordinate is a difference between a fourth X-coordinate of the fourth coordinates and the first distance difference, and the second Y-coordinate is a difference between a fourth Y-coordinate of the fourth coordinates and the second distance difference.

In some embodiments, the processor 2502 is further configured to implement the following steps. A target area of the target image is divided into P sampling points, the target area is an area whose PPI is lower than a preset pixel threshold, and P is a positive integer; fifth coordinates of each sampling point of the P sampling points in the reference coordinate system are determined; a sampling point satisfying a preset condition is determined from the sampling points of the N sampling images according to fifth coordinates of a first sampling point, and the first sampling point is any one of the P sampling points; image information of a first sampling point is determined according to image information of the sampling point satisfying the preset condition; and the image information of the first sampling point is added to image information of the target image according to the fifth coordinates of the first sampling point.

In some embodiments, the processor 2502 is further configured to implement the following steps. following distances within M sampling cycles are acquired, and a single sampling cycle corresponds to a single sampling image; L sampling images are determined according to the following distances in the M sampling cycles, and L is a positive integer less than or equal to M; and the N sampling images are determined from the L sampling images; and the N sampling images are stored. A position of the target vehicle corresponding to each sampling image of the N sampling images is different. The L sampling images satisfy the following conditions: if following distances within an a-th sampling cycle to a b-th sampling cycle are all greater than a preset distance threshold, the L sampling images include sampling images within a 1st sampling cycle to the b-th sampling cycle, a is a positive integer, b is a positive integer greater than a, and a difference between a and b is greater than or equal to a first preset quantity threshold; if a number of following distances greater than the preset distance threshold of following distances within the 1st sampling cycle to a c-th sampling cycle is greater than a second preset quantity threshold, the L sampling images include sampling images within the 1st sampling cycle to the c-th sampling cycle, a value of c is determined according to the speed of the target vehicle or the current position of the target vehicle, and c is a positive integer greater than 1; and if a forced synthesis switch is in a turned-on state (i.e., the image synthesis is enforced), the L sampling images include the sampling images in the 1st sampling cycle to the c-th sampling cycle or sampling images within the 1st sampling cycle to a d-th sampling cycle, a value of d is determined according to the speed of the target vehicle or the current position of the target vehicle, and d is a positive integer greater than c.

In some embodiments, the processor 2502 is further configured to implement: determining driving assistance line(s) according to the target image and driving information of the target vehicle; and adding the driving assistance line(s) to the target image.

In some embodiments, the first Y-coordinate satisfies a formula:

$$Y_1 = \tan(\arctan(Y_3/Ob) + \beta) \times h$$

$Y_1$ is the first Y-coordinate; $Y_3$ is the third Y-coordinate; Ob is the focal length of the image acquisition device; $\beta$ is the sampling angle of the image acquisition device; and h is the vertical distance between the image acquisition device and the ground.

In some embodiments, the first X-coordinate satisfies a formula:

$$X_1 = X_3 \times (((Y_1 - f)/k)/J)$$

$X_1$ is the first X-coordinate; $X_3$ is the third X-coordinate; f is the slope of the first straight line; k is the slope of the second straight line; and J is the target quantity.

In some embodiments, the communication interface 2501 is configured to support communication of a user identification device with other network entities. The processor 2502 is further configured to control and manage actions of the user identification device, and/or to perform other steps of the method described herein. The vehicle navigation image synthesizing device 250 may further include a memory and a bus, and the memory is configured to store program codes and data of the user identification device.

The processor 2502 may be any logical block, module or circuit that implements or executes the method described in the embodiments/examples of the present disclosure. The processor may be a central processing unit, a general purpose processor, a digital signal processor, an application specific integrated circuit, a field programmable gate array or other programmable logic device, a transistor logic device, a hardware component or any combination thereof. The processor may also be a combination of devices implementing computing functions, for example, a combination of one or more microprocessors, or a combination of a digital signal processor (DSP) and a microprocessor.

The memory may be a memory in the user identification device. The memory may be a volatile memory, such as a random access memory. The memory may also be a non-volatile memory, such as a read-only memory, a flash memory, a hard disk or a solid state disk. The memory may also be a combination of the above types of memory.

The bus may be an extended industry standard architecture (EISA) bus or the like. The bus may be an address bus, a data bus, a control bus, etc.

Through the description of the above embodiments, those skilled in the art can clearly understand that for the convenience and brevity of the description, the division of the above functional modules is only taken as an example for illustration. In practical applications, the above functions may be allocated to different functional modules according to needs. That is, the internal structure of the device is divided into different functional modules to complete part or all of the functions described above. As for the specific operating processes of the above systems, devices, and units, reference may be made to the corresponding processes of the method in the foregoing embodiments, and details will not be repeated here.

Some embodiments of the present disclosure provide a computer program product including instructions. When the computer program product is run on a computer, the computer program product causes the computer to execute the vehicle navigation image synthesis method described in the above embodiments.

Some embodiments of the present disclosure also provide a non-transitory computer-readable storage medium. The non-transitory computer-readable storage medium stores instructions. When instructions are executed by a computer (e.g., a vehicle navigation image synthesis system), the computer implements steps of the vehicle navigation image synthesis method described in the above embodiments.

The non-transitory computer-readable storage medium may be, for example, but not limited to, an electrical, magnetic, optical, electromagnetic, infrared, or semiconductor system, apparatus, or device, or any combination thereof. More specifically, an example (a non-exhaustive list) of the non-transitory computer-readable storage medium would include the following: an electrical connection having one or more wires, a portable computer diskette, a hard disk, a random access memory (RAM), a read-only memory (ROM), an erasable programmable read-only memory (EPROM), a register, an optical fiber, a portable compact disk read-only memory (CD-ROM), an optical storage device, a magnetic storage device, any suitable combination of the foregoing, or any other form of the non-transitory computer-readable storage medium known in the art. For example, the non-transitory storage medium is coupled to the processor, so that the processor can read information from the non-transitory storage medium, and write information into the non-transitory storage medium. Of course, the non-transitory storage medium may also be a component of the processor. The processor and the non-transitory storage medium may be located in an application specific integrated circuit (ASIC). In the embodiments of the present disclosure, the non-transitory computer-readable storage medium may be any tangible medium including or storing a program, and the program may be used in an instruction execution system, an apparatus, a device, or their combination.

Some embodiments of the present disclosure provide a chip. The chip includes a processor and a communication interface; the processer is coupled to the communication interface, and is configured to execute a computer program or instructions to implement the vehicle navigation image synthesis method as described in the above embodiments.

In some embodiments, the chip further includes a memory, and the memory is used for storing the computer program or the instructions.

Those skilled in the art will understand that the disclosed scope of the present disclosure is not limited to the above-mentioned specific embodiments, and some elements of the embodiments can be modified and replaced without departing from the spirit of the present disclosure. The scope of the present disclosure is limited by the appended claims.

What is claimed is:

1. A vehicle navigation image synthesis method applied to a vehicle navigation image synthesis system, comprising:
acquiring M sampling images, wherein the M sampling images include a preset sampling image for establishing a reference coordinate system, the preset sampling image is a sampling image in which a stop line or a zebra crossing is acquired for a first time, and M is a positive integer;
storing N sampling images, wherein N is a positive integer less than or equal to M, the N sampling images are incomplete images, a value of N is determined according to a speed of a target vehicle, a position of the target vehicle, and a following distance of the target vehicle;
determining a plurality of sampling points of each sampling image of the N images;
determining first coordinates of each sampling point of the plurality of sampling points of each sampling image, wherein the first coordinates include a first Y-coordinate and a first X-coordinate; the first Y-coordinate is determined according to parameters of an image acquisition device and a position of each sampling point in a sampling image where each sampling point is located; the first X-coordinate is determined according to projections, on an intermediate coordinate system, of border lines of the sampling image where each sampling point is located; and the intermediate coordinate system is a coordinate system established according to a current position of the target vehicle and a current driving direction of the target vehicle;
mapping the first coordinates of each sampling point to the reference coordinate system to determine second coordinates of each sampling point; and
synthesizing sampling points of the N sampling images according to second coordinates of the sampling points of the N sampling images to determine a target image, wherein the target image is a complete image; and determining, by the vehicle navigation image synthesis system, image information of an entire junction according to the target image.

2. The method according to claim 1, wherein determining the first Y-coordinate of each sampling point includes:
determining a target sampling point and a target sampling image where the target sampling point is located, wherein the target sampling point is a sampling point of a plurality of sampling points of the target sampling image, and the target sampling image is a sampling image of the N sampling images;
establishing an image coordinate system of the target sampling image, wherein an origin of the image coordinate system is a center point of the target sampling image, an X-axis of the image coordinate system is perpendicular to a left border line of the target sampling image or a right border line of the target sampling image, and a Y-axis of the image coordinate system is perpendicular to an upper border line of the target sampling image or a lower border line of the target sampling image;
determining third coordinates of the target sampling point in the image coordinate system, wherein the third coordinates of the target sampling point in the image coordinate system include a third Y-coordinate and a third X-coordinate; the third X-coordinate is an X-coordinate of the target sampling point of the image coordinate system; and the third Y-coordinate is a Y-coordinate of the target sampling point of the image coordinate system; and
determining a first Y-coordinate of the target sampling point according to the parameters of the image acquisition device and the third Y-coordinate, wherein the parameters of the image acquisition device include a vertical distance between the image acquisition device and a ground, a sampling angle of the image acquisition device, and a focal length of the image acquisition device; and the sampling angle of the image acquisition device is an included angle between an acquisition direction of the image acquisition device and a direction perpendicular to the ground.

3. The method according to claim 2, wherein determining the first X-coordinate of each sampling point includes:
establishing an intermediate coordinate system corresponding to the target sampling image, wherein an origin of the intermediate coordinate system corresponding to the target sampling image is a current position of the target vehicle corresponding to the target sampling image, a positive direction of a Y-axis of the intermediate coordinate system corresponding to the target sampling image is a current driving direction of the target vehicle corresponding to the target sampling image, and an X-axis of the intermediate coordinate system corresponding to the target sampling image is parallel to the ground;
determining a slope of a first straight line, a slope of a second straight line, and a target quantity, wherein the first straight line is a straight line obtained by projecting the left border line of the target sampling image on the intermediate coordinate system corresponding to the target sampling image; the second straight line is a straight line obtained by projecting the right border line of the target sampling image on the intermediate coordinate system corresponding to the target sampling image; and the target quantity is a half of a number of sampling points of the target sampling image on the X-axis of the image coordinate system; and
determining a first X-coordinate of the target sampling point according to the slope of the first straight line, the slope of the second straight line, the target quantity, the first Y-coordinate of the target sampling point, and the third X-coordinate.

4. The method according to claim 3, wherein the first X-coordinate satisfies a formula:

$$X_1 = X_3 \times (((Y_1-f)/k)/J);$$

wherein $X_1$ is the first X-coordinate; $X_3$ is the third X-coordinate; $Y_1$ is the first Y-coordinate; f is the slope of the first straight line; k is the slope of the second straight line; and J is the target quantity.

5. The method according to claim 2, wherein mapping the first coordinates of each sampling point to the reference coordinate system to determine the second coordinates of each sampling point includes:
mapping the first coordinates of each sampling point to an angle-restoration coordinate system to determine fourth coordinates of each sampling point, wherein the angle-restoration coordinate system is a coordinate system obtained by rotating the intermediate coordinate system by a preset angle; and
mapping the fourth coordinates of each sampling point to the reference coordinate system to determine the second coordinates of each sampling point.

6. The method according to claim 5, wherein mapping the first coordinates of each sampling point to the angle-restoration coordinate system to determine the fourth coordinates of each sampling point includes:
acquiring a deviation angle of the target vehicle, wherein the deviation angle of the target vehicle is an included angle between the current driving direction of the target vehicle and a straight-line driving direction of the target vehicle;
determining a preset angle of the target sampling image, wherein the preset angle of the target sampling image is determined according to the deviation angle of the target vehicle within a sampling cycle of the target sampling image;
rotating the target sampling image and the intermediate coordinate system corresponding to the target sampling image clockwise by the preset angle of the target sampling image to determine an angle-restored target sampling image and an angle-restoration coordinate system corresponding to the target sampling image; and
determining coordinates of the target sampling point of the angle-restored target sampling image in the angle-restoration coordinate system corresponding to the target sampling image as fourth coordinates of the target sampling point.

7. The method according to claim 6, wherein mapping the fourth coordinates of each sampling point to the reference coordinate system to determine the second coordinates of each sampling point includes:
establishing the reference coordinate system, wherein an origin of the reference coordinate system is a position of the target vehicle within a sampling cycle of the preset sampling image, a positive direction of a Y-axis of the reference coordinate system is a driving direction of the target vehicle within the sampling cycle of the preset sampling image, and an X-axis of the reference coordinate system is parallel to the ground;
determining a first distance difference and a second distance difference, wherein the first distance difference is a distance difference between an origin of the angle-restoration coordinate system and the origin of the reference coordinate system in a direction of an X-axis of the angle-restoration coordinate system, and the second distance difference is a distance difference between the origin of the angle-restoration coordinate system and the origin of the reference coordinate system in a direction of a Y-axis of the angle-restoration coordinate system; and determining a second X-coordinate and a second Y-coordinate included in the second coordinates, wherein the second X-coordinate is a difference between a fourth X-coordinate of the fourth coordinates and the first distance difference, and the second Y-coordinate is a difference between a fourth Y-coordinate of the fourth coordinate and the second distance difference.

8. The method according to claim 5, wherein after synthesizing the sampling points of the N sampling images according to the second coordinates of the sampling points of the N sampling images to determine the target image, the method further comprises:

dividing a target area of the target image into P sampling points;

determining fifth coordinates of each of the P sampling points in the reference coordinate system, wherein the target area is an area whose pixels per inch (PPI) is lower than a preset PPI threshold, and P is a positive integer;

determining a sampling point satisfying a preset condition from the sampling points of the N sampling images according to the fifth coordinates of the first sampling point, wherein the first sampling point is a sampling point of the P sampling points;

determining image information of the first sampling point according to image information of the sampling point satisfying the preset condition; and adding the image information of the first sampling point to image information of the target image according to the fifth coordinates of the first sampling point.

9. The method according to claim 2, wherein the first Y-coordinate satisfies a formula:

$$Y_1 = \tan(\arctan(Y_3/Ob) + \beta) \times h;$$

wherein $Y_1$ is the first Y-coordinate; $Y_3$ is the third Y-coordinate; Ob is the focal length of the image acquisition device; $\beta$ is the sampling angle of the image acquisition device; and h is the vertical distance between the image acquisition device and the ground.

10. The method according to claim 1, wherein storing the N sampling images includes:

acquiring following distances within M sampling cycles, wherein a single sampling cycle corresponds to a single sampling image of the M sampling images;

determining L sampling images according to the following distances within the M sampling cycles, wherein L is a positive integer less than or equal to M; and determining the N sampling images from the L sampling images; and storing the N sampling images, wherein positions of the target vehicle corresponding to the N sampling images are different;

in a case that following distances within an a-th sampling cycle to a b-th sampling cycle are all greater than a preset distance threshold, the L sampling images include sampling images within a 1st sampling cycle to the b-th sampling cycle; wherein a is a positive integer, b is a positive integer greater than a, and a difference between a and b is greater than or equal to a first preset quantity threshold; or in a case that a number of following distances greater than the preset distance threshold of following distances within the 1st sampling cycle to a c-th sampling cycle is greater than a second preset quantity threshold, the L sampling images include sampling images within the 1st sampling cycle to the c-th sampling cycle; wherein a value of c is determined according to the speed of the target vehicle or the current position of the target vehicle, and c is a positive integer greater than 1; or in a case that a forced synthesis switch is in a turned-on state, the L sampling images include the sampling images within the 1st sampling cycle to the c-th sampling cycle or sampling images within the 1st sampling cycle to a d-th sampling cycle; wherein a value of d is determined according to the speed of the target vehicle or the current position of the target vehicle, and d is a positive integer greater than c.

11. The method according to claim 1, wherein after synthesizing the sampling points of the N sampling images according to the second coordinates of the sampling points of the N sampling images to determine the target image, the method further comprises:

determining a driving assistance line according to the target image and driving information of the target vehicle; and adding the driving assistance line to the target image.

12. A non-transitory computer-readable storage medium, wherein the non-transitory computer-readable storage medium stores instructions, and when the instructions are executed by a computer, the computer implements the vehicle navigation image synthesis method according to claim 1.

13. A vehicle navigation image synthesis device applied to a vehicle navigation image synthesis system, comprising:

a communication interface;

a processor coupled to the communication interface and configured to execute a computer program or instructions to implement:

acquiring M sampling images, wherein the M sampling images include a preset sampling image for establishing a reference coordinate system, the preset sampling image is a sampling image in which a stop line or a zebra crossing is acquired for a first time, and M is a positive integer;

storing N sampling images, wherein N is a positive integer less than or equal to M, the N sampling images are incomplete images, a value of N is determined according to a speed of a target vehicle, a position of the target vehicle, and a following distance of the target vehicle;

determining a plurality of sampling points of each sampling image of the N sampling images;

determining first coordinates of each sampling point of the plurality of sampling points of each sampling image, wherein the first coordinates include a first Y-coordinate and a first X-coordinate; the first Y-coordinate is determined according to parameters of an image acquisition device and a position of each sampling point in a sampling image where each sampling point is located; the first X-coordinate is determined according to projections, on an intermediate coordinate system, of border lines of the sampling image where each sampling point is located; and the intermediate coordinate system is a coordinate system established according to a current position of the target vehicle and a current driving direction of the target vehicle;

mapping the first coordinates of each sampling point to the reference coordinate system to determine second coordinates of each sampling point; and synthesizing sampling points of the N sampling images according to second coordinates of the sampling points of the N sampling images to determine a target image, wherein the target image is a complete image; and determining, by the vehicle navigation image synthesis system, image information of an entire junction according to the target image.

14. The device according to claim 13, wherein the processor is configured to implement:

determining a target sampling point and a target sampling image where the target sampling point is located, wherein the target sampling point is a sampling point of a plurality of sampling points of the target sampling image, and the target sampling image is a sampling image of the N sampling images;

establishing an image coordinate system of the target sampling image, wherein an origin of the image coordinate system is a center point of the target sampling image, an X-axis of the image coordinate system is perpendicular to a left border line of the target sampling image or a right border line of the target sampling image, and a Y-axis of the image coordinate system is perpendicular to an upper border line of the target sampling image or a lower border line of the target sampling image;

determining third coordinates of the target sampling point in the image coordinate system, wherein the third coordinates of the target sampling point in the image coordinate system include a third Y-coordinate and a third X-coordinate; the third X-coordinate is an X-coordinate of the target sampling point of the image coordinate system; and the third Y-coordinate is a Y-coordinate of the target sampling point of the image coordinate system; and determining a first Y-coordinate of the target sampling point according to the parameters of the image acquisition device and the third Y-coordinate, wherein the parameters of the image acquisition device include a vertical distance between the image acquisition device and a ground, a sampling angle of the image acquisition device, and a focal length of the image acquisition device; and the sampling angle of the image acquisition device is an included angle between an acquisition direction of the image acquisition device and a direction perpendicular to the ground.

15. The device according to claim 14, wherein the processor is configured to implement:

establishing an intermediate coordinate system corresponding to the target sampling image, wherein an origin of the intermediate coordinate system corresponding to the target sampling image is a current position of the target vehicle corresponding to the target sampling image, a positive direction of a Y-axis of the intermediate coordinate system corresponding to the target sampling image is a current driving direction of the target vehicle corresponding to the target sampling image, and an X-axis of the intermediate coordinate system corresponding to the target sampling image is parallel to the ground;

determining a slope of a first straight line, a slope of a second straight line, and a target quantity, wherein the first straight line is a straight line obtained by projecting the left border line of the target sampling image on the intermediate coordinate system corresponding to the target sampling image; the second straight line is a straight line obtained by projecting the right border line of the target sampling image on the intermediate coordinate system corresponding to the target sampling image; and the target quantity is a half of a number of sampling points of the target sampling image on the X-axis of the image coordinate system; and determining a first X-coordinate of the target sampling point according to the slope of the first straight line, the slope of the second straight line, the target quantity, the first Y-coordinate of the target sampling point, and the third X-coordinate.

16. The device according to claim 14, wherein the processor is configured to implement:

mapping the first coordinates of each sampling point to an angle-restoration coordinate system to determine fourth coordinates of each sampling point, wherein the angle-restoration coordinate system is a coordinate system obtained by rotating the intermediate coordinate system by a preset angle; and mapping the fourth coordinates of each sampling point to the reference coordinate system to determine the second coordinates of each sampling point.

17. The device according to claim 16, wherein the processor is configured to implement:

acquiring a deviation angle of the target vehicle, wherein the deviation angle of the target vehicle is an included angle between the current driving direction of the target vehicle and a straight-line driving direction of the target vehicle;

determining a preset angle of the target sampling image, wherein the preset angle of the target sampling image is determined according to the deviation angle of the target vehicle within a sampling cycle of the target sampling image;

rotating the target sampling image and the intermediate coordinate system corresponding to the target sampling image clockwise by the preset angle of the target sampling image to determine an angle-restored target sampling image and an angle-restoration coordinate system corresponding to the target sampling image; and determining coordinates of the target sampling point of the angle-restored target sampling image in the angle-restoration coordinate system corresponding to the target sampling image as fourth coordinates of the target sampling point.

18. The device according to claim 17, wherein the processor is configured to implement:

establishing the reference coordinate system, wherein an origin of the reference coordinate system is a position of the target vehicle within a sampling cycle of the preset sampling image, a positive direction of a Y-axis of the reference coordinate system is a driving direction of the target vehicle within the sampling cycle of the preset sampling image, and an X-axis of the reference coordinate system is parallel to the ground;

determining a first distance difference and a second distance difference, wherein the first distance difference is a distance difference between an origin of the angle-restoration coordinate system and the origin of the reference coordinate system in a direction of an X-axis of the angle-restoration coordinate system, and the second distance difference is a distance difference between the origin of the angle-restoration coordinate system and the origin of the reference coordinate system in a direction of a Y-axis of the angle-restoration coordinate system; and determining a second X-coordinate and a second Y-coordinate included in the second coordinates, wherein the second X-coordinate is a difference between a fourth X-coordinate of the fourth coordinates and the first distance difference, and the second Y-coordinate is a difference between a fourth Y-coordinate of the fourth coordinate and the second distance difference.

19. The device according to claim 16, wherein the processor is configured to implement:

dividing a target area of the target image into P sampling points;

determining fifth coordinates of each of the P sampling points in the reference coordinate system, wherein the target area is an area whose PPI is lower than a preset PPI threshold, and P is a positive integer;

determining a sampling point satisfying a preset condition from the sampling points of the N sampling images according to the fifth coordinates of the first sampling point, wherein the first sampling point is a sampling point of the P sampling points;

determining image information of the first sampling point according to image information of the sampling point satisfying the preset condition; and adding the image information of the first sampling point to image information of the target image according to the fifth coordinates of the first sampling point.

20. The device according to claim 13, wherein the processor is configured to implement:

acquiring following distances within M sampling cycles, wherein a single sampling cycle corresponds to a single sampling image of the M sampling images;

determining L sampling images according to the following distances within the M sampling cycles, wherein L is a positive integer less than or equal to M; and determining the N sampling images from the L sampling images; and storing the N sampling images, wherein positions of the target vehicle corresponding to the N sampling images are different;

in a case that following distances within an a-th sampling cycle to a b-th sampling cycle are all greater than a preset distance threshold, the L sampling images include sampling images within a 1st sampling cycle to the b-th sampling cycle; wherein a is a positive integer, and b is a positive integer greater than a, and a difference between a and b is greater than or equal to a first preset quantity threshold; or in a case that a number of following distances greater than the preset distance threshold of following distances within the 1st sampling cycle to a c-th sampling cycle is greater than a second preset quantity threshold, the L sampling images include sampling images within the 1st sampling cycle to the c-th sampling cycle; wherein a value of c is determined according to the speed of the target vehicle or the current position of the target vehicle; and c is a positive integer greater than 1; or in a case that a forced synthesis switch is in a turned-on state, the L sampling images include the sampling images within the 1st sampling cycle to the c-th sampling cycle or sampling images within the 1st sampling cycle to a d-th sampling cycle; wherein a value of d is determined according to the speed of the target vehicle or the current position of the target vehicle, and d is a positive integer greater than c.

* * * * *